United States Patent
Hueffer et al.

(10) Patent No.: US 12,281,225 B2
(45) Date of Patent: Apr. 22, 2025

(54) PROCESS FOR PREPARING STABLE POLYMERS CONTAINING VINYLIMIDAZOLE

(71) Applicant: BASF SE, Carl-Bosch-Strasse (DE)

(72) Inventors: Stephan Hueffer, Ludwigshafen (DE); Roland Ettl, Ludwigshafen (DE); Ruediger Lukas, Ludwigshafen (DE); Andrea Schiller, Ludwigshafen (DE); Frank Dietsche, Ludwigshafen (DE); Juergen Detering, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 997 days.

(21) Appl. No.: 17/258,645

(22) PCT Filed: Jul. 3, 2019

(86) PCT No.: PCT/EP2019/067904
§ 371 (c)(1),
(2) Date: Jan. 7, 2021

(87) PCT Pub. No.: WO2020/011627
PCT Pub. Date: Jan. 16, 2020

(65) Prior Publication Data
US 2021/0269630 A1    Sep. 2, 2021

(30) Foreign Application Priority Data
Jul. 11, 2018    (EP) ..................................... 18182831

(51) Int. Cl.
| | | |
|---|---|---|
| C11D 11/00 | (2006.01) |
| C08J 3/00 | (2006.01) |
| C08K 5/19 | (2006.01) |
| C08L 39/06 | (2006.01) |
| C11D 1/62 | (2006.01) |
| C11D 3/00 | (2006.01) |
| C11D 3/37 | (2006.01) |
| C11D 17/00 | (2006.01) |

(52) U.S. Cl.
CPC .............. *C08L 39/06* (2013.01); *C08J 3/005* (2013.01); *C08K 5/19* (2013.01); *C11D 1/62* (2013.01); *C11D 3/0021* (2013.01); *C11D 3/3776* (2013.01); *C11D 17/0008* (2013.01); *C11D 2111/12* (2024.01)

(58) Field of Classification Search
None
See application file for complete search history.

(56) References Cited

U.S. PATENT DOCUMENTS

| | | |
|---|---|---|
| 5,964,939 A | 10/1999 | Fox et al. |
| 2003/0224030 A1 | 12/2003 | Uchiyama et al. |
| 2009/0029898 A1* | 1/2009 | Voelkel ................. C11D 1/835 510/353 |
| 2013/0108959 A1 | 5/2013 | Bauer et al. |

FOREIGN PATENT DOCUMENTS

| | | |
|---|---|---|
| DE | 102006004697 A1 | 8/2007 |
| EP | 0698046 B1 | 3/1997 |
| WO | WO 03044146 A1 * | 5/2003 |

OTHER PUBLICATIONS

International Search Report for corresponding PCT/EP2019/067904 mailed Oct. 8, 2019, 2 pages.
European Search Report for EP Patent Application No. 18182831.0, Issued on Jan. 7, 2019, 3 pages.

* cited by examiner

*Primary Examiner* — Lorna M Douyon
(74) *Attorney, Agent, or Firm* — Armstrong Teasdale LLP

(57) ABSTRACT

Described herein are aqueous mixtures including water, 1-vinylimidazole-containing polymer(s) (P) and quaternary ammonium salts (QA). Also described herein are methods of production and use of same.

16 Claims, No Drawings

PROCESS FOR PREPARING STABLE POLYMERS CONTAINING VINYLIMIDAZOLE

CROSS-REFERENCE TO RELATED APPLICATIONS

This application is a U.S. National Phase Application of International Patent Application No. PCT/EP2019/067904, filed Jul. 3, 2019, which claims the benefit of priority to European Patent Application No. 18182831.0, filed Jul. 11, 2018, the entire contents of which are hereby incorporated by reference herein.

FIELD OF INVENTION

The present invention relates to an aqueous mixture comprising or consisting of water, 1-vinylimidazole-containing polymer(s) (P) and quaternary ammonium salts (QA), its production and use.

BACKGROUND

In this text, the term "vinylimidazole" (abbreviated: VI) is used synonymously for the compound 1-vinylimidazole.

Vinylimidazole (VI)-based polymers are known per se and are used, inter alia, in the washing products industry as dye transfer inhibitors.

The production and use of vinylimidazole (VI)-based polymers is described, inter alia, in EP 0 698 046 B1.

In addition, U.S. Pat. No. 5,964,939 A describes aqueous compositions comprising dye transfer inhibitors (in particular polypyrrolidone), DE 10 2006 004697 A1 describes washing or cleaning compositions comprising, inter alia, a certain ammonium salt as a dye transfer inhibitor, US 2003/224030 A1 describes methods and articles for reducing particles in the air, and US 2013/108959 A1 describes the use of a composition comprising vinyl monomer-containing polymers and at least one halogen-free biocide.

Vinylimidazole (VI)-based polymers pose particular challenges to product stability beyond two to three months of storage. Product stability concerns both microbiological and physical stability.

Stabilizers comprising isothiazolinone-based biocides that have been on the market to date initially form stable polymer and washing-composition formulations with VI-containing polymers. However, the vinylimidazole group appears to decompose this type of biocide. Moreover, the decomposed biocides lead to an unstable formulation with visible (physical) stability problems, such as turbidity, color (increase in color number) and phase separation. Therefore, a longer-term (physical) stability of more than three months (at room temperature) with the conventional, predominantly isothiazolinone-based biocides cannot be achieved in the case of vinylimidazole-containing polymers, whereas 12 to 24 months are standard in the case of other systems. Biocides and the use thereof are, for example, described in Wallhäußers Praxis der Sterilisation, Antiseptik und Konservierung: Qualitätssicherung der Hygiene in Industrie, Pharmazie und Medizin [Wallhäußer's practice of sterilization, antisepsis and preservation: hygiene quality assurance in industry, pharmacy and medicine]; ISBN: 9783131411211.

With respect to VI-containing polymers having a VI proportion of greater than 5% by weight, the particular problem arises that VI induces the decomposition of most stabilizers or all commercially available stabilizers for microbiological stability that meet the regulatory PT6 requirements of the European Chemical Agency (ECHA) for the washing products industry.

Moreover, washing-composition formulations generally comprise (especially) anionic surfactants. It was therefore previously assumed that cationic compounds would not be usable as stabilizers in a washing-composition formulation with respect to physical stability because of interactions.

DESCRIPTION

However, it has now been found that, surprisingly, (cationic) quaternary ammonium salts can solve the above-described problems which occur specifically in the case of vinylimidazole-containing polymers. Adding at least 0.01% by weight of said salts yields a formulation which is storage-stable at room temperature for a period of 18 months (or 18 weeks at elevated temperature, 40° C.). Neither an increase in color intensity (as measured by color number) nor a color shift of the intrinsic color typical of the product occurs, and turbidities or phase separation are not observed.

Microbiological activity, too, is still present after 12 months at room temperature (or 12 weeks at elevated temperature).

Therefore, it is possible to considerably improve, inter alia, the use properties of washing-composition formulations comprising vinylimidazole-containing polymers.

The present invention therefore provides a process for producing an aqueous mixture comprising or consisting of water, at least one 1-vinylimidazole-containing polymer (P) and at least one quaternary ammonium salt (QA), by adding an aqueous solution of at least one quaternary ammonium salt (QA) to an aqueous solution of at least one 1-vinylimidazole-containing polymer (P) and subsequent mixing.

The present invention further provides a process for producing a liquid washing composition, by producing an aqueous mixture as described in the preceding claims, and adding at least one component selected from the list comprising or consisting of anionic surfactants, nonionic surfactants, cationic surfactants, amphoteric surfactants, enzymes, optical brighteners, complexing agents, polymers, copolymers, soaps, silicone defoamers, solubilizers, short-chain alcohols, dyes, fragrances and mixtures thereof.

The present invention also provides an aqueous mixture comprising or consisting of at least one 1-vinylimidazole-containing polymer (P) and at least one quaternary ammonium salt (QA).

The polymers (P) are preferably soluble in water at room temperature.

In one embodiment of the present invention, the proportion of water is greater than 10% by weight, preferably greater than 20% by weight, further preferably at least 25% by weight, based on the total mixture.

In a preferred embodiment of the present invention, the 1-vinylimidazole-containing polymers (P) are selected from polymers having a proportion of vinylimidazole of greater than or equal to 5% by weight, further preferably greater than or equal to 10% by weight, more preferably greater than or equal to 15% by weight, based on the polymer (P).

In one embodiment of the present invention, the 1-vinylimidazole-containing polymers (P) are homopolymers of 1-vinylimidazole.

In another embodiment of the present invention, the 1-vinylimidazole-containing polymers (P) are selected from copolymers of 1-vinylimidazole with at least one further monomer (A), the at least one further monomer (A) preferably being selected from the list consisting of vinylpiperidone, vinylcaprolactam, 1-vinyloxazolidinone, 4-vinylpyridine N-oxide, N-vinylformamide, N-vinylacetamide, N-vinyl-N-methylacetamide, acrylamide, basic monomers and their quaternized variants, isoprenol, styrene, 1-alkenes, vinyl esters, vinyl ethers, alkyl (meth)acrylates, alkyl maleates, N,N'-dialkylacrylamides, (meth)acrylic acid, itaconic acid, maleic acid, fumaric acid and its alkali metal salts, monomers containing alkylene oxide groups, and mixtures thereof.

In a preferred embodiment of the present invention, the 1-vinylimidazole-containing polymers (P) are selected from copolymers of 1-vinylimidazole with at least one further monomer (A), the at least one further monomer (A) being 1-vinylpyrrolidone.

In one embodiment of the present invention, the 1-vinylimidazole-containing polymers (P) are obtained by polymerizing 1-vinylimidazole and optionally monomer (A), optionally in the presence of up to 50% by weight, preferably up to 30% by weight, of polyalkylene glycols, based on the monomers used, the polyalkylene glycols being preferably polyethylene glycols.

According to the invention, the 1-vinylimidazole-containing polymers (P) which are liquid at room temperature preferably have a molecular weight Mw of 2000 to 200 000 g/mol, further preferably 3000 to 100 000 g/mol, more preferably 5000 to 80 000 g/mol (determined by SEC, i.e. size-exclusion chromatography).

According to the invention, the quaternary ammonium salts (QA) used are preferably halide salts, more preferably selected from the list consisting of bromide salts and chloride salts.

Further counterions of the invention can, for example, be selected from the list comprising (or consisting of) halides, sulfates, carbonates, tartrates, citrates, lactates, acetates, formates, hydroxides, methanesulfonates and monomethyl sulfate.

At the same time, in one embodiment of the present invention, the quaternary ammonium salts (QA) comprise at least one alkyl chain, preferably each comprising 2 to 20, more preferably 4 to 18, methylene groups.

According to the invention, the quaternary ammonium salts (QA) are more preferably selected from the list consisting of didecyldimethylammonium chloride, benzalkonium chloride, cetylalkonium chloride, cetylpyridinium chloride and mixtures thereof.

According to the invention, the quaternary ammonium salts (QA) are, in one embodiment, present in the mixture in a proportion of at least 0.01% by weight to 2.0% by weight, preferably 0.01% by weight to 1.0% by weight, further preferably 0.03% to 0.3% by weight, more preferably 0.05% to 0.10% by weight, based on the total mixture.

In one embodiment of the present invention, the mixture comprises polymers (P) in a proportion of 5% to 90% by weight, preferably 20% to 60% by weight, based on the total mixture.

The present invention moreover also provides a washing or cleaning composition, preferably liquid washing composition, comprising the mixture of the invention and additionally at least one further component selected from the list comprising or consisting of anionic surfactants, nonionic surfactants, cationic surfactants, amphoteric surfactants, enzymes, optical brighteners, complexing agents, polymers, copolymers, soaps, silicone defoamers, solubilizers, short-chain alcohols, dyes, fragrances and mixtures thereof.

The washing or cleaning composition (preferably liquid washing composition) of the invention preferably comprises the following constituents:

A) at least one surfactant,
B) optionally at least one builder,
C) optionally at least one bleach system,
D) optionally at least one further additive preferably selected from enzymes, enzyme stabilizers, bases, corrosion inhibitors, defoamers and foam inhibitors, dyes, fragrances, fillers, tableting aids, disintegrants, thickeners, solubilizers, organic solvents, electrolytes, pH modifiers, perfume carriers, bitter substances, fluorescers, hydrotropes, antiredeposition agents, optical brighteners, graying inhibitors, antishrink agents, anticrease agents, dye transfer inhibitors, antimicrobial active ingredients, antioxidants, antiyellowing agents, corrosion inhibitors, antistats, ironing aids, hydrophobizing and impregnating agents, antiswell and antislip agents, and UV absorbers,
E) the mixture of the invention, and
F) optionally water.

In the context of the present invention, the builder B) also comprises compounds referred to as sequestrant, complexing agent, chelator, chelating agent or softener.

The bleach systems C) comprise, as well as bleaches, optionally also bleach activators, bleach catalysts and/or bleach stabilizers.

The washing and cleaning composition of the invention more preferably comprises at least one enzyme as additive D).

Component A)

The washing and cleaning compositions of the invention comprise at least one surfactant as component A). Suitable surfactants A) are nonionic, anionic, cationic or amphoteric surfactants.

Examples of surfactants A) which may be used in the context of the present invention include nonionic surfactants (NIS). Nonionic surfactants used are preferably alkoxylated alcohols. Preference is given to alkoxylated primary alcohols. Preferred alkoxylated alcohols are ethoxylated alcohols having preferably 8 to 18 carbon atoms in the alkyl radical and an average of 1 to 12 mol of ethylene oxide (EO) per mole of alcohol. The alcohol radical may be linear or preferably 2-methyl-branched or may comprise linear and methyl-branched radicals in a mixture, as typically present in oxo process alcohol radicals. Especially preferred are alcohol ethoxylates having linear or branched radicals from alcohols of native or petrochemical origin having 12 to 18 carbon atoms, for example from coconut alcohol, palm alcohol, tallow fatty alcohol or oleyl alcohol, and an average of 2 to 8 EO per mole of alcohol.

The ethoxylated alcohols are preferably selected from:
$C_{12}C_{14}$-alcohols with 3 EO, 5 EO, 7 EO or 9 EO,
$C_9C_{11}$-alcohols with 7 EO,
$C_{13}$-oxo process alcohols with 3 EO, 5 EO, 7 EO or 9 EO,
$C_{13}C_{15}$-alcohols with 3 EO, 5 EO, 7 EO or 9 EO,
$C_{12}C_{13}$-alcohols with 3 EO, 5 EO, 7 EO or 9 EO and mixtures thereof,
2-propylheptanol with 3 EO, 4 EO, 5 EO, 6 EO, 7 EO, 8 EO and 9 EO and mixtures of two or more than two of the aforementioned ethoxylated alcohols.

A preferred mixture of nonionic surfactants is a mixture of $C_{12}C_{14}$-alcohol (lauryl alcohol/myristyl alcohol) with 3 EO and $C_{12}C_{13}$-alcohol (lauryl alcohol/myristyl alcohol/cetyl alcohol/stearyl alcohol) with 7 EO. Preference is also given to mixtures of short-chain alcohol ethoxylates (e.g. 2-propylheptanol with 7 EO) and long-chain alcohol ethoxylates (e.g. $C_{16}C_{18}$ with 7 EO).

The stated ethoxylation levels are statistical averages (number averages, Mn), which may be an integer or a fraction for a specific product. Preferred alcohol ethoxylates have a narrowed homolog distribution (narrow range ethoxylates, NRE). In addition to these nonionic surfactants, it is also possible to use fatty alcohols with more than 12 EO. Examples of these are tallow fatty alcohol with 14 EO, 25 EO, 30 EO or 40 EO. Also usable are nonionic surfactants comprising ethylene oxide (EO) and propylene oxide (PO) groups together in the molecule. It is possible here to use block copolymers with EO-PO block units or PO-EO block units, but also EO-PO-EO copolymers or PO-EO-PO copolymers. It is of course also possible to use mixedly alkoxylated nonionic surfactants in which EO and PO units are not in blocks but in random distribution. Such products are obtainable by simultaneous action of ethylene oxide and propylene oxide on fatty alcohols.

Surfactants suitable as component A) are also polyetherols, preferably with a number-average molecular weight of at least 200 g/mol.

Suitable polyetherols may be linear or branched, preferably linear. Suitable polyetherols generally have a number-average molecular weight in the range from about 200 to 100 000 g/mol, preferably 300 to 50 000 g/mol, more preferably 500 to 40 000 g/mol. Suitable polyetherols are, for example, water-soluble or water-dispersible nonionic polymers having repeat alkylene oxide units. Preferably, the proportion of repeat alkylene oxide units is at least 30% by weight, based on the total weight of the compound. Suitable polyetherols are polyalkylene glycols, such as polyethylene glycols, polypropylene glycols, polytetrahydrofurans and alkylene oxide copolymers. Suitable alkylene oxides for preparation of alkylene oxide copolymers are, for example, ethylene oxide, propylene oxide, epichlorohydrin, 1,2- and 2,3-butylene oxide. Suitable examples are copolymers of ethylene oxide and propylene oxide, copolymers of ethylene oxide and butylene oxide, and copolymers of ethylene oxide, propylene oxide and at least one butylene oxide. The alkylene oxide copolymers may comprise the copolymerized alkylene oxide units in randomly distributed form or in the form of blocks. Preferably, the proportion of repeat units derived from ethylene oxide in the ethylene oxide/propylene oxide copolymers is 40% to 99% by weight. Particular preference is given to ethylene oxide homopolymers and ethylene oxide/propylene oxide copolymers.

In addition, further nonionic surfactants which may be used are also alkyl glycosides of the general formula (IV)

$$R^{10}O(G)_i \quad (IV)$$

in which
R$^{10}$ is a primary straight-chain or methyl-branched aliphatic radical having 8 to 22 carbon atoms,
G is a glycoside unit having 5 or 6 carbon atoms, and
i is any number between 1 and 10.

In the compounds of the formula (IV), R$^{10}$ is preferably a 2-methyl-branched aliphatic radical having 8 to 22 and preferably 12 to 18 carbon atoms.

G is preferably glucose.

The oligomerization level i, which states the distribution of monoglycosides and oligoglycosides, is preferably within a range from 1.2 to 1.4.

A further class of nonionic surfactants which are used with preference in the context of the present invention and are used either as the sole nonionic surfactant or in combination with other nonionic surfactants is that of alkoxylated, preferably ethoxylated or ethoxylated and propoxylated, fatty acid alkyl esters, preferably having 1 to 4 carbon atoms in the alkyl chain. Especially preferred are fatty acid methyl esters as described, for example, in the Japanese patent application JP 58/217598, or those which are preferably prepared by the process described in the international patent application WO 90/13533.

Further suitable nonionic surfactants are amine oxides, for example N-cocoalkyl-N,N-dimethylamine oxide and N-tallowalkyl-N,N-dihydroxyethylamine oxide, and fatty acid alkanolamides. These nonionic surfactants are preferably used as a mixture with alkoxylated alcohols.

Preference is given to the mixture with ethoxylated fatty alcohols. The weight amount of these nonionic surfactants is preferably not more than that of the ethoxylated fatty alcohols, especially not more than half thereof.

Further suitable surfactants A) are polyhydroxy fatty acid amides of the formula (V)

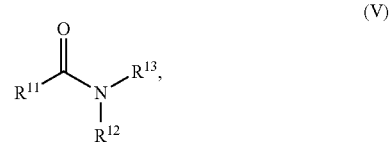

(V)

in which the R$^{11}$—C(=O) group is an aliphatic acyl radical having 6 to 22 carbon atoms, R$^{12}$ is hydrogen, an alkyl radical having 1 to 4 carbon atoms or a hydroxyalkyl radical having 1 to 4 carbon atoms, and R$^{13}$ is a linear or branched polyhydroxyalkyl radical having 3 to 10 carbon atoms and 3 to 10 hydroxyl groups. The polyhydroxy fatty acid amides are known substances which can typically be obtained by reductive amination of a reducing sugar with ammonia, an alkylamine or an alkanolamine and subsequent acylation with a fatty acid, a fatty acid alkyl ester or a fatty acid chloride. The group of polyhydroxy fatty acid amides includes in this connection also compounds of the formula (VI)

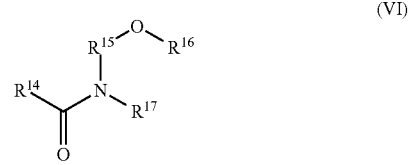

(VI)

in which R$^{14}$ is a linear or branched alkyl or alkenyl radical having 7 to 12 carbon atoms, R$^{15}$ is a linear, branched or cyclic alkylene radical having 2 to 8 carbon atoms or an arylene radical having 6 to 8 carbon atoms, and R$^{16}$ is a linear, branched or cyclic alkyl radical or an aryl radical or an oxyalkyl radical having 1 to 8 carbon atoms, preference being given to C$_1$-C$_4$-alkyl or phenyl radicals, and R$^{17}$ is a linear polyhydroxyalkyl radical wherein the alkyl chain is substituted by at least two hydroxyl groups, or alkoxylated, preferably ethoxylated or propoxylated derivatives of this radical. R$^{17}$ is preferably obtained by reductive amination of a sugar, for example glucose, fructose, maltose, lactose, galactose, mannose or xylose. The N-alkoxy- or N-aryloxy-substituted compounds can then be converted to the desired polyhydroxy fatty acid amides, for example according to WO 95/07331 by reaction with fatty acid methyl esters in the presence of an alkoxide as catalyst.

Suitable surfactants A) are also anionic surfactants. Typical examples of anionic surfactants are soaps, alkylsulfonates, alkylbenzenesulfonates, olefinsulfonates, methyl ester sulfonates, sulfo fatty acids, alkyl sulfates, mono- and dialkyl sulfosuccinates, mono- and dialkyl sulfosuccinamates, sulfotriglycerides, amide soaps, ethercarboxylic acids and salts thereof, fatty acid isethionates, fatty acid sarcosinates, fatty acid taurides, N-acylamino acids, for example acyl lactylates, acyl tartrates, acyl glutamates and acyl aspartates, alkyl oligoglucoside sulfates, alkylglucose carboxylates, protein fatty acid condensates and alkyl (ether) phosphates.

A first preferred embodiment is that of anionic surfactants of the sulfonate and sulfate types. Preferred surfactants of the sulfonate type are $C_9$-$C_{13}$-alkylbenzenesulfonates, olefinsulfonates, i.e. mixtures of alkene- and hydroxyalkanesulfonates, and disulfonates as obtained, for example, from $C_{12}$-$C_{13}$-monoolefins having a terminal or internal double bond by sulfonation with gaseous sulfur trioxide and subsequent alkaline or acidic hydrolysis of the sulfonation products. Also suitable are alkanesulfonates which are obtained from $C_{12}$-$C_{18}$-alkanes, for example, by sulfochlorination or sulfoxidation with subsequent hydrolysis and/or neutralization. Also likewise suitable are the esters of α-sulfo fatty acids (estersulfonates), for example the α-sulfonated methyl esters of hydrogenated coconut, palm kernel or tallow fatty acids. Further suitable anionic surfactants are sulfated fatty acid glycerol esters. Fatty acid glycerol esters are understood to mean, inter alia, the mono-, di- and triesters, and mixtures thereof, as obtained in the preparation by esterification of a monoglycerol with 1 to 3 mol of fatty acid or in the transesterification of triglycerides with 0.3 to 2 mol of glycerol. Preferred sulfated fatty acid glycerol esters here are the sulfation products of saturated fatty acids having 6 to 22 carbon atoms, for example of caproic acid, caprylic acid, capric acid, myristic acid, lauric acid, palmitic acid, stearic acid or behenic acid.

Preferred alk(en)yl sulfates are the alkali metal and especially the sodium salts of the sulfuric monoesters of $C_{12}$-$C_{13}$-fatty alcohols, for example of coconut fatty alcohol, tallow fatty alcohol or lauryl, myristyl, cetyl or stearyl alcohol, or of the $C_{10}$-$C_{20}$-oxo process alcohols and the monoesters of secondary $C_{10}$-$C_{20}$-alcohols. Additionally preferred are alk(en)yl sulfates comprising a synthetic petrochemical-based straight-chain $C_{10}$-$C_{20}$-alkyl radical. These have analogous degradation behavior to the equivalent compounds based on oleochemical raw materials. From the point of view of washing, preference is given to the $C_{12}$-$C_{16}$-alkyl sulfates and $C_{12}$-$C_{15}$-alkyl sulfates, and also $C_{14}$-$C_{15}$-alkyl sulfates. 2,3-Alkyl sulfates, which are prepared for example in accordance with the US patent specifications 3,234,258 or 5,075,041 and can be obtained as commercial products of the Shell Oil Company under the name DAN®, are also suitable anionic surfactants. Also suitable among other substances are the sulfuric monoesters of the straight-chain or branched $C_7$-$C_2$ alcohols which have been ethoxylated with 1 to 6 mol of ethylene oxide, such as 2-methyl-branched $C_9$-$C_{11}$ alcohols with an average of 3.5 mol of ethylene oxide (EO)

or $C_{12}$-$C_{18}$ fatty alcohols with 1 to 4 EO. They are usually used in cleaning compositions only in relatively small amounts, for example in amounts from 1% to 5% by weight, on account of their high foam behavior. Further suitable anionic surfactants in the context of the present invention are also the salts of alkylsulfosuccinic acid, which are also referred to as sulfosuccinates or as sulfosuccinic acid esters and are the monoesters and/or diesters of sulfosuccinic acid with alcohols, preferably fatty alcohols and especially ethoxylated fatty alcohols. Preferred sulfosuccinates comprise $C_8$-$C_{18}$ fatty alcohol radicals or mixtures of these. Particularly preferred sulfosuccinates comprise a fatty alcohol radical derived from ethoxylated fatty alcohols. Particular preference is given here in turn to sulfosuccinates wherein the fatty alcohol radicals are derived from ethoxylated fatty alcohols having a narrow homolog distribution. It is likewise also possible to use alk(en)ylsuccinic acid having preferably 8 to 18 carbon atoms in the alk(en)yl chain or salts thereof.

Particularly preferred anionic surfactants are soaps. Saturated and unsaturated fatty acid soaps are suitable, such as the salts of lauric acid, myristic acid, palmitic acid, stearic acid, (hydrogenated) erucic acid and behenic acid, and especially soap mixtures derived from natural fatty acids, for example coconut fatty acids, palm kernel fatty acids, olive oil fatty acids or tallow fatty acids.

The anionic surfactants including the soaps may be present in the form of their sodium, potassium or ammonium salts, or as soluble salts of organic bases, such as mono-, di- or triethanolamine. The anionic surfactants are preferably in the form of their sodium or potassium salts, especially in the form of the sodium salts.

Suitable surfactants A) are also cationic surfactants. Particularly preferred cationic surfactants are:

$C_7$-$C_{25}$-alkylamines;

N,N-dimethyl-N-(hydroxy-$C_7$-$C_{25}$-alkyl)ammonium salts;

mono- and di($C_7$-$C_{25}$-alkyl)dimethylammonium compounds quaternized with alkylating agents;

ester quats, especially quaternary esterified mono-, di- and trialkanolamines esterified with $C_8$-$C_{22}$-carboxylic acids;

imidazoline quats, especially 1-alkylimidazolinium salts of the formulae VII or VIII

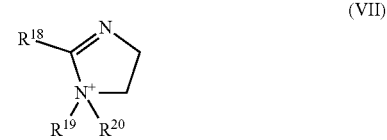

(VII)

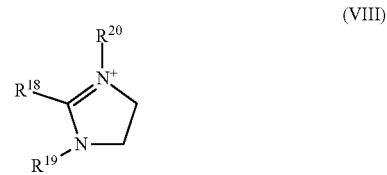

(VIII)

where the variables are defined as follows:

$R^{18}$ is $C_1$-$C_{25}$-alkyl or $C_2$-$C_{25}$-alkenyl, $R^{19}$ is $C_1$-$C_4$-alkyl or hydroxy-$C_1$-$C_4$-alkyl, $R^{20}$ is $C_1$-$C_4$-alkyl, hydroxy-$C_1$-$C_4$-alkyl or an $R^{21}$—(CO)—$R^{22}$—$(CH_2)_r$ radical where $R^{21}$ is H or $C_1$-$C_4$-alkyl, $R^{22}$ is —O— or —NH— and r is 2 or 3, where at least one $R^{18}$ radical is a $C_7$-$C_{22}$-alkyl radical.

The surfactants A) may also be amphoteric surfactants. Suitable amphoteric surfactants are alkyl betaines, alkyl amidobetaines, alkyl sulfobetaines, aminopropionates, aminoglycinates and amphoteric imidazolium compounds. For example, it is possible to use cocodimethylsulfopropyl betaine, lauryl betaine, cocamidopropyl betaine, sodium cocamphopropionate or tetradecyl-dimethylamine oxide.

The content of surfactants in washing and cleaning compositions in liquid and gel form is preferably 2% to 75% by weight and especially 5% to 65% by weight, based in each case on the overall composition.

The content of surfactants in solid washing and cleaning compositions is preferably 2% to 40% by weight and especially 5% to 35% by weight, based in each case on the overall composition.

Component B)

Builders, which are sometimes also referred to as sequestrant, complexing agent, chelator, chelating agent or softener, bind alkaline earth metals and other water-soluble metal salts without precipitation. They help to break up soil, disperse soil particles and help to detach soil, and sometimes themselves have a washing effect.

Suitable builders may either be organic or inorganic in nature. Examples are aluminosilicates, carbonates, phosphates and polyphosphates, polycarboxylic acids, polycarboxylates, hydroxycarboxylic acids, phosphonic acids, e.g. hydroxyalkylphosphonic acids, phosphonates, aminopolycarboxylic acids and salts thereof and polymeric compounds containing carboxylic acid groups, and salts thereof.

Suitable inorganic builders are, for example, crystalline or amorphous aluminosilicates having ion-exchanging properties, such as zeolites. Different types of zeolites are suitable, especially zeolites A, X, B, P, MAP and HS in their sodium form or in forms in which sodium has been partly exchanged for other cations such as Li, K, Ca, Mg or ammonium. Suitable zeolites are described, for example, in U.S. Pat. No. 4,604,224. Crystalline silicates suitable as builders are, for example, disilicates or phyllosilicates, e.g. 5-$Na_2Si_2O_5$ or B—$Na_2Si_2O_5$(SKS 6 or SKS 7). The silicates can be used in the form of their alkali metal, alkaline earth metal or ammonium salts, preferably as sodium, lithium and magnesium silicates. Amorphous silicates, such as, for example, sodium metasilicate, which has a polymeric structure, or amorphous disilicate (Britesil® H 20, manufacturer: Akzo) are likewise usable. Among these, preference is given to sodium disilicate.

Suitable inorganic builder substances based on carbonate are carbonates and hydrogencarbonates. These can be used in the form of their alkali metal, alkaline earth metal or ammonium salts. Preference is given to using sodium carbonates and hydrogencarbonates, lithium carbonates and hydrogencarbonates and magnesium carbonates and hydrogencarbonates, especially sodium carbonate and/or sodium hydrogencarbonate.

Customary phosphates used as inorganic builders are alkali metal orthophosphates and/or polyphosphates, for example pentasodium triphosphate.

Suitable organic builders are, for example, $C_4$-$C_{30}$-di-, -tri- and -tetracarboxylic acids, for example succinic acid, propanetricarboxylic acid, butanetetracarboxylic acid, cyclopentanetetracarboxylic acid and alkyl- and alkenylsuccinic acids having $C_2$-$C_{20}$-alkyl or -alkenyl radicals.

Suitable organic builders are also hydroxycarboxylic acids and polyhydroxycarboxylic acids (sugar acids). These include $C_4$-$C_{20}$-hydroxycarboxylic acids such as e.g. malic acid, tartaric acid, gluconic acid, mucic acid, lactic acid, glutaric acid, citric acid, tartronic acid, glucoheptonic acid, lactobionic acid and sucrosemono-, -di- and -tricarboxylic acid.

Among these, preference is given to citric acid and salts thereof.

Suitable organic builders are additionally phosphonic acids, for example hydroxyalkylphosphonic acids, aminophosphonic acids and the salts thereof. These include, for example, phosphonobutanetricarboxylic acid, aminotrismethylenephosphonic acid, ethylenediaminetetraethylenephosphonic acid, hexamethylenediaminetetramethylenephosphonic acid, diethylenetriaminepentamethylenephosphonic acid, morpholinomethanediphosphonic acid, 1-hydroxy-$C_1$- to —$C_{10}$-alkyl-1,1-diphosphonic acids such as 1-hydroxyethane-1,1-diphosphonic acid. Among these, preference is given to 1-hydroxyethane-1,1-diphosphonic acid and salts thereof.

Suitable organic builders are also aminopolycarboxylic acids, such as nitrilotriacetic acid (NTA), nitrilomonoacetic dipropionic acid, nitrilotripropionic acid, β-alaninediacetic acid (β-ADA), ethylenediaminetetraacetic acid (EDTA), diethylenetriaminepentaacetic acid, propylene-1,3-diaminetetraacetic acid, propylene-1,2-diaminetetraacetic acid, N-(alkyl)ethylenediaminetriacetic acid, N-(hydroxyalkyl)-ethylenediaminetriacetic acid, ethylenediaminetriacetic acid, cyclohexylene-1,2-diaminetetraacetic acid, iminodisuccinic acid, hydroxyiminodisuccinic acid, ethylenediaminedisuccinic acid, serinediacetic acid, isoserinediacetic acid, L-asparaginediacetic acid, L-glutaminediacetic acid, glutamic acid diacetic acid, methylglycinediacetic acid (MGDA) and the salts of the aforementioned aminopolycarboxylic acids. Preference is given to methylglycinediacetic acid, glutamic acid diacetic acid and salts thereof. The salts of methylglycinediacetic acid may be in racemic form, meaning that D and L enantiomers are present in an equimolar mixture, or one enantiomer, e.g. the L enantiomer, may be present in excess.

Suitable organic builders are also polymeric compounds containing carboxylic acid groups, such as acrylic acid homopolymers. These preferably have a number-average molecular weight in the range from 800 to 70 000 g/mol, more preferably from 900 to 50 000 g/mol, particularly 1000 to 20 000 g/mol and especially 1000 to 10 000 g/mol. In this context, the term "acrylic acid homopolymer" also encompasses polymers in which the carboxylic acid groups are in partly or fully neutralized form. These include acrylic acid homopolymers in which the carboxylic acid groups are present partly or completely in the form of alkali metal salts or ammonium salts. Preference is given to acrylic acid homopolymers in which the carboxylic acid groups are protonated or are partly or completely in the form of sodium salts.

Suitable polymeric compounds containing carboxylic acid groups are also oligomaleic acids, as described, for example, in EP-A 451 508 and EP-A 396 303.

Suitable polymeric compounds containing carboxylic acid groups are also terpolymers of unsaturated $C_4$-$C_8$ dicarboxylic acids, which may include copolymerized monoethylenically unsaturated monomers from the group (i) mentioned below in amounts of up to 95% by weight, from the group (ii) in amounts of up to 60% by weight and from the group (iii) in amounts of up to 20% by weight as comonomers. Suitable unsaturated $C_4$-$C_8$ dicarboxylic acids here are, for example, maleic acid, fumaric acid, itaconic acid and citraconic acid. Preference is given to maleic acid. Group (i) encompasses monoethylenically unsaturated $C_3$-$C_8$ monocarboxylic acids, for example acrylic acid, methacrylic acid, crotonic acid and vinylacetic acid. From group (i), preference is given to using acrylic acid and methacrylic acid. Group (ii) encompasses monoethylenically unsaturated $C_2$-$C_{22}$ olefins, vinyl alkyl ethers having $C_1$-$C_8$-alkyl groups, styrene, vinyl esters of $C_1$-$C_8$ carboxylic acids, (meth)acrylamide and vinylpyrrolidone. From group (ii), preference is given to using $C_2$-$C_6$ olefins, vinyl alkyl ethers having $C_1$-$C_4$-alkyl groups, vinyl acetate and vinyl propionate. If the polymers of group (ii) comprise copolymerized vinyl esters, these may also be in partly or fully hydrolyzed form to give vinyl alcohol structural units. Suitable co- and terpolymers are known, for example, from U.S. Pat. No. 3,887,806 and DE-A 4313909. Group (iii) encompasses (meth)acrylic esters of $C_1$-$C_8$ alcohols, (meth) acrylonitrile, (meth)acrylamides of $C_1$-$C_8$ amines, N-vinylformamide and N-vinylimidazole.

Suitable polymeric compounds containing carboxylic acid groups are also homopolymers of monoethylenically unsaturated $C_3$-$C_8$ monocarboxylic acids, for example acrylic acid, methacrylic acid, crotonic acid and vinylacetic acid, especially of acrylic acid and methacrylic acid, copolymers of dicarboxylic acids, for example copolymers of maleic acid or itaconic acid and acrylic acid in a weight ratio of from 10:90 to 95:5, more preferably those in a weight ratio of from 30:70 to 90:10 with molar masses of from 1000 to 150 000 g/mol; terpolymers of maleic acid, acrylic acid and a vinyl ester of a $C_1$-$C_3$ carboxylic acid in a weight ratio of from 10 (maleic acid):90 (acrylic acid+vinyl ester) to 95 (maleic acid):10 (acrylic acid+vinyl ester), the weight ratio of acrylic acid to vinyl ester being variable in the range from 30:70 to 70:30; copolymers of maleic acid with $C_2$-$C_8$ olefins in a molar ratio of from 40:60 to 80:20, particular preference being given to copolymers of maleic acid with ethylene, propylene or isobutene in a molar ratio of 50:50.

Suitable polymeric compounds containing carboxylic acid groups are also copolymers of 50% to 98% by weight of ethylenically unsaturated weak carboxylic acids with 2% to 50% by weight of ethylenically unsaturated sulfonic acids, as described, for example, in EP-A-0877002. Suitable weak ethylenically unsaturated carboxylic acids are especially $C_3$-$C_6$ monocarboxylic acids, such as acrylic acid and methacrylic acid. Suitable ethylenically unsaturated sulfonic acids are 2-acetylamidomethyl-1-propanesulfonic acid, 2-methacrylamido-2-methyl-1-propanesulfonic acid, 2-methacrylamido-2-hydroxypropanesulfonic acid, allylsulfonic acid, methallylsulfonic acid, allyloxybenzenesulfonic acid, methallyloxybenzenesulfonic acid, 2-hydroxy-3-(2-propenyloxy)propanesulfonic acid, 2-methyl-2-propene-1-sulfonic acid, styrenesulfonic acid, vinylsulfonic acid, 3-sulfopropyl acrylate, 3-sulfopropyl methacrylate, sulfomethylacrylamide, sulfomethylmethacrylamide and salts of these acids. The copolymers may also comprise 0% to 30% by weight of copolymerized ethylenically unsaturated $C_4$-$C_8$ dicarboxylic acids, such as maleic acid, and 0% to 30% by weight of at least one monomer copolymerizable with the aforementioned monomers. The latter monomer comprises, for example, $C_1$-$C_4$-alkyl esters of (meth)acrylic acid, $C_1$-$C_4$-hydroxyalkyl esters of (meth)acrylic acid, acrylamide, alkyl-substituted acrylamide, N,N-dialkyl-substituted acrylamide, vinylphosphonic acid, vinyl acetate, allyl alcohols, sulfonated allyl alcohols, styrene and other vinylaromatics, acrylonitrile, N-vinylpyrrolidone, N-vinylformamide, N-vinylimidazole or N-vinylpyridine. The weight-average molecular weight of these copolymers is in the range from 3000 to 50 000 daltons. Copolymers with about 77% by weight of at least one ethylenically unsaturated $C_3$-$C_6$ monocarboxylic acid and about 23% by weight of at least one ethylenically unsaturated sulfonic acid are particularly suitable.

Graft polymers of unsaturated carboxylic acids onto low molecular weight carbohydrates or hydrogenated carbohydrates, cf. U.S. Pat. No. 5,227,446, DE-A 4415623 and DE-A 4313909, are likewise suitable. Suitable unsaturated carboxylic acids here are, for example, maleic acid, fumaric acid, itaconic acid, citraconic acid, acrylic acid, methacrylic acid, crotonic acid and vinylacetic acid, and mixtures of acrylic acid and maleic acid, which are grafted on in amounts of 40% to 95% by weight, based on the component to be grafted. For the modification, it is additionally possible for up to 30% by weight, based on the component to be grafted, of further monoethylenically unsaturated monomers to be present in copolymerized form. Suitable modifying monomers are the aforementioned monomers of groups (ii) and (iii). Suitable graft bases are degraded polysaccharides, for example acidically or enzymatically degraded starches, inulins or cellulose, protein hydrolyzates and reduced (hydrogenated or reductively aminated) degraded polysaccharides, for example mannitol, sorbitol, aminosorbitol and N-alkylglucamine, and also polyalkylene glycols having molar masses with up to $M_W$=5000, for example polyethylene glycols, ethylene oxide/propylene oxide or ethylene oxide/butylene oxide or ethylene oxide/propylene oxide/butylene oxide block copolymers and alkoxylated mono- or polyhydric $C_1$-$C_{22}$ alcohols (cf. U.S. Pat. No. 5,756,456).

Likewise suitable are polyglyoxylic acids as described, for example, in EP-B-001004, U.S. Pat. No. 5,399,286, DE-A-4106355 and EP-A-656914. The end groups of the polyglyoxylic acids can have different structures.

Also suitable are polyamidocarboxylic acids and modified polyamidocarboxylic acids; these are known, for example, from EP-A-454126, EP-B-511037, WO-A94/01486 and EP-A-581452.

It is also possible to use polyaspartic acids and the alkali metal salts thereof or cocondensates of aspartic acid with other amino acids, for example with glycine, glutamic acid or lysine, $C_4$-$C_{25}$ mono- or dicarboxylic acids and/or $C_4$-$C_{25}$ mono- or diamines as polymeric compounds containing carboxylic acid groups.

Among the polymeric compounds containing carboxylic acid groups, preference is given to polyacrylic acids, also in partly or fully neutralized form.

Suitable organic builders are also iminodisuccinic acid, oxydisuccinic acid, aminopolycarboxylates, alkylpolyaminocarboxylates, aminopolyalkylenephosphonates, polyglutamates, hydrophobically modified citric acid, for example agaric acid, poly-[alpha]-hydroxyacrylic acid, Nacylethylenediamine triacetates such as lauroylethylenediamine triacetate, and alkylamides of ethylenediaminetetraacetic acid such as EDTA tallow amide.

In addition, it is also possible to use oxidized starches as organic builders.

Component C)

The bleach systems C) comprise at least one bleach and optionally at least one further component selected from bleach activators, bleach catalysts and bleach stabilizers.

Suitable bleaches are, for example, percarboxylic acids, e.g. diperoxododecanedicarboxylic acid, phthalimidopercaproic acid or monoperoxophthalic acid or -terephthalic acid, salts of percarboxylic acids, e.g. sodium percarbonate, adducts of hydrogen peroxide onto inorganic salts, e.g. sodium perborate monohydrate, sodium perborate tetrahydrate, sodium carbonate perhydrate or sodium phosphate perhydrate, adducts of hydrogen peroxide onto organic compounds, e.g. urea perhydrate, or of inorganic peroxo salts, e.g. alkali metal persulfates, or peroxodisulfates.

Suitable bleach activators are, for example, polyacylated sugars, e.g. pentaacetylglucose; acyloxybenzenesulfonic acids and their alkali metal and alkaline earth metal salts, e.g. sodium p-nonanoyloxybenzenesulfonate or sodium p-benzoyloxybenzenesulfonate; —N,N-diacylated and N,N, N',N'-tetraacylated amines, e.g. N,N,N',N'-tetraacetylmethylenediamine and -ethylenediamine (TAED), N,N-diacetylaniline, N,N-diacetyl-p-toluidine or 1,3-diacylated hydantoins such as 1,3-diacetyl-5,5-dimethylhydantoin;

N-alkyl-N-sulfonylcarbonamides, e.g. Nmethyl-N-mesylacetamide or N-methyl-N-mesylbenzamide; N-acylated cyclic hydrazides, acylated triazoles or urazoles, e.g. monoacetylmaleic hydrazide; O,N,N-trisubstituted hydroxylamines, e.g. O-benzoyl-N,N-succinylhydroxylamine, O-acetyl-N,N-succinylhydroxylamine or O,N,N-triacetylhydroxylamine; N,N-diacylsulfurylamides, e.g. N,N'-dimethyl-N,N'-diacetylsulfurylamide or N,N'-diethyl-N,N'-dipropionylsulfurylamide; acylated lactams, e.g. acetylcaprolactam, octanoylcaprolactam, benzoylcaprolactam or carbonylbiscaprolactam; anthranil derivatives, e.g. 2-methylanthranil or 2-phenylanthranil; triacyl cyanurates, e.g. triacetyl cyanurate or tribenzoyl cyanurate; oxime esters and bisoxime esters, e.g. O-acetylacetone oxime or bisisopropyl iminocarbonate; carboxylic anhydrides, e.g. acetic anhydride, benzoic anhydride, m-chlorobenzoic anhydride or phthalic anhydride; enol esters, e.g. isopropenyl acetate; 1,3-diacyl-4,5-diacyloxyimidazolines, e.g. 1,3-diacetyl-4,5-diacetoxyimidazoline; tetraacetylglycoluril and tetrapropionylglycoluril; diacylated 2,5-diketopiperazines, e.g. 1,4-diacetyl-2,5-diketopiperazine; ammonium-substituted nitriles, e.g. N-methylmorpholinioacetonitrile methylsulfate; acylation products of propylenediurea and 2,2-dimethylpropylenediurea, e.g. tetraacetylpropylenediurea; α-acyloxypolyacylmalonamide, e.g. α-acetoxy-N,N'-diacetylmalonamide; diacyldioxohexahydro-1,3,5-triazines, e.g. 1,5-diacetyl-2,4-dioxohexahydro-1,3,5-triazine; benz-(4H)-1,3-oxazin-4-ones with alkyl radicals, e.g. methyl, or aromatic radicals, e.g. phenyl, in the 2 position.

A bleach system composed of bleaches and bleach activators may optionally also comprise bleach catalysts. Suitable bleach catalysts are, for example, quaternized imines and sulfonimines, which are described, for example, in U.S. Pat. No. 5,360,569 and EP-A 453 003. Particularly effective bleach catalysts are manganese complexes, which are described, for example, in WO-A 94/21777. In the case of use thereof in the washing and cleaning compositions, such compounds are incorporated in maximum amounts of up to 1.5% by weight, especially up to 0.5% by weight, and in the case of very active manganese complexes in amounts of up to 0.1% by weight. As well as the bleach system composed of bleaches, bleach activators and optionally bleach catalysts described, the use of systems with enzymatic peroxide release or of photoactivated bleach systems is also possible for the washing and cleaning compositions of the invention.
Component D)

Suitable enzymes (=component D1) are those as customarily used as industrial enzymes. These include both enzymes with optimal activity in the neutral to alkaline pH range and enzymes with optimal activity in the acidic pH range. In a specific embodiment, the component D1) additionally comprises at least one enzyme stabilizer. Suitable enzyme stabilizers D1) are those as customarily used.

The enzymes are preferably selected from aminopeptidases, amylases, arabinases, carbohydrases, carboxypeptidases, catalases, cellulases, chitinases, cutinases, cyclodextrin glycosyltransferases, deoxyribonucleases, esterases, galactanases, alpha-galactosidases, betagalactosidases, glucanases, glucoamylases, alpha-glucosidases, beta-glucosidases, haloperoxidases, hydrolase invertases, isomerases, keratinases, laccases, lipases, mannanases, mannosidases, oxidases, pectinolytic enzymes, peptidoglutaminases, peroxidases, peroxygenases, phytases, polyphenol oxidases, proteolytic enzymes, ribonucleases, transglutaminases, transferases, xylanases and mixtures thereof.

The enzymes are specifically selected from hydrolases, such as proteases, esterases, glucosidases, lipases, amylases, cellulases, mannanases, other glycosyl hydrolases and mixtures of the aforementioned enzymes. All these hydrolases contribute to soil dissolution and removal of protein-, grease- or starch-containing soiling. Oxireductases can also be used for bleaching. Of particularly good suitability are enzymatic active ingredients obtained from bacterial strains or fungi such as *Bacillus subtilis, Bacillus licheniformis, Streptomyceus griseus* and *Humicola* insolens.

Preferred enzymes are described more particularly below:
Proteases:

Suitable proteolytic enzymes (proteases) may in principle be of animal, plant or microbial origin.

Preference is given to proteolytic enzymes of microbial origin. These also include chemically or genetically modified mutants.
Lipases:

Suitable lipases may in principle originate from bacteria or fungi. These also include chemically or genetically modified mutants.
Amylases:

In principle, all α- and/or β-amylases are suitable. Suitable amylases may in principle originate from bacteria or fungi. These also include chemically or genetically modified mutants.
Cellulases:

In principle, all cellulases are suitable. Suitable cellulases may in principle originate from bacteria or fungi. These also include chemically or genetically modified mutants.
Peroxidases/Oxidases:

Suitable peroxidases/oxidases may in principle originate from plants, bacteria or fungi. These also include chemically or genetically modified mutants.
Lyases:

In principle, all lyases are suitable. Suitable lyases may in principle originate from bacteria or fungi. These also include chemically or genetically modified mutants.

Compositions of the invention may comprise further enzymes which are referred to collectively by the term hemicellulases. These include, for example, mannanases, xanthan lyases, pectinylases (=pectinases), pectin esterases, xyloglucanases (=xylanases), pullulanases and β-glucanases.

Preferably, the washing or cleaning composition of the invention comprises at least one enzyme selected from proteases, amylases, mannanases, cellulases, lipases, pectin lyases and mixtures thereof.

Preferably, the washing or cleaning composition of the invention comprises at least one protease and/or amylase.

Preferably, the washing, cleaning or dishwashing composition of the invention comprises an enzyme mixture. For example, preference is given to enzyme mixtures comprising or consisting of the following enzymes:
  protease and amylase,
  protease and lipase (or lipolytic enzymes),
  protease and cellulase,
  amylase, cellulase and lipase (or lipolytic enzymes),
  protease, amylase and lipase (or lipolytic enzymes),
  protease, lipase (or lipolytic enzymes) and cellulase.

The enzymes can be adsorbed onto carrier substances in order to protect them from premature decomposition.

The washing or cleaning composition of the invention may optionally also comprise enzyme stabilizers D1). These include, for example, calcium propionate, sodium formate, boric acids, boronic acids and salts thereof, such as 4-formylphenylboronic acid, peptides and peptide derivatives, for example peptide aldehydes, polyols, such as propane-1,2-diol, and mixtures thereof.

The washing or cleaning compositions of the invention comprise the enzymes preferably in an amount of 0.1% to 5% by weight, more preferably 0.12% to 2.5% by weight, based on the total weight of the washing or cleaning compositions.

In order to impart the desired viscosity to liquid and specifically aqueous compositions, it is additionally possible to use at least one thickener (=component D2) as component D).

Suitable thickeners in principle are any known thickeners (rheology modifiers), provided they do not have any adverse effect on the action of the washing and cleaning composition. Suitable thickeners may either be of natural origin or synthetic in nature.

Examples of thickeners of natural origin are xanthan, carob seed flour, guar flour, carrageenan, agar, tragacanth, gum arabic, alginates, modified starches, such as hydroxyethyl starch, starch phosphate esters or starch acetates, dextrins, pectins and cellulose derivatives, such as carboxymethyl cellulose, hydroxyethyl cellulose, hydroxypropyl cellulose, hydroxypropyl methyl cellulose, methyl cellulose and the like.

Thickeners of natural origin are also inorganic thickeners, such as polysilicic acids and clay minerals, e.g. phyllosilicates, and also the silicates specified under the builders.

Examples of synthetic thickeners are polyacrylic and polymethacrylic compounds, such as (partly) crosslinked homopolymers of acrylic acid, for example with an allyl ether of sucrose or pentaerythritol or propylene-crosslinked homopolymers of acrylic acid (carbomers), e.g. the Carbopol® grades from BF Goodridge (e.g. Carbopol® 676, 940, 941, 934 and the like) or the Polygel@grades from 3V Sigma (e.g. Polygel® DA), copolymers of ethylenically unsaturated monoor dicarboxylic acids, e.g. terpolymers of acrylic acid, methacrylic acid or maleic acid with methyl or ethyl acrylate and a (meth)acrylate derived from long-chain ethoxylated alcohols, e.g. the Acusol® grades from Rohm & Haas (e.g. Acusol® 820 or 1206A), copolymers of two or more monomers selected from acrylic acid, methacrylic acid and their $C_1$-$C_4$-alkyl esters, e.g. copolymers of methacrylic acid, butyl acrylate and methyl methacrylate or of butyl acrylate and methyl methacrylate, e.g. the Aculyn® and Acusol® grades from Rohm & Haas (e.g. Aculyn® 22, 28 or 33 and Acusol® 810, 823 and 830), or crosslinked high-molecular-weight acrylic acid copolymers, e.g. copolymers, crosslinked with an allyl ether of sucrose or pentaerythritol, of $C_{10}$-$C_{30}$-alkyl acrylates with one or more comonomers selected from acrylic acid, methacrylic acid and their $C_1$-$C_4$-alkyl esters (e.g. Carbopol® ETD 2623, Carbopol® 1382 or Carbopol® AQUA 30 from Rohm & Haas).

Examples of synthetic thickeners are also reaction products of maleic acid polymers with ethoxylated long-chain alcohols, e.g. the Surfonic L series from Texaco Chemical Co. or Gantrez AN119 from ISP; polyethylene glycols, polyamides, polyimines and polycarboxylic acids.

Also suitable are mixtures of the aforementioned thickeners.

Preferred thickeners are xanthans and the aforementioned polyacrylic and polymethacrylic compounds.

Suitable organic solvents (=component D3) are selected from mono- or polyhydric alcohols, alkanolamines or glycol ethers. Preferably, they are selected from ethanol, n- or isopropanol, butanols, glycol, propane- or butanediol, glycerol, diglycol, propyl or butyl diglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl, ethyl or propyl ether, dipropylene glycol monomethyl or -ethyl ether, diisopropylene glycol monomethyl or -ethyl ether, methoxy, ethoxy or butoxy triglycol, isobutoxyethoxy-2-propanol, 3-methyl-3-methoxybutanol, propylene glycol t-butyl ether, and mixtures of these solvents.

Useful foam inhibitors or defoamers (=component D4) are, for example, soaps, paraffins or silicone oils, which can optionally be applied to carrier materials.

Suitable bases (=component D5) are alkali metal hydroxides, alkaline earth metal hydroxides, alkali metal carbonates, alkaline earth metal carbonates, ammonium carbonate, alkali metal hydrogencarbonates, alkaline earth metal hydrogencarbonates, ammonium hydrogencarbonates and mixtures thereof. Preference is given to using sodium, lithium and magnesium carbonates or sodium, lithium and magnesium hydrogencarbonates, especially sodium carbonate and/or sodium hydrogencarbonate.

In addition, the washing or cleaning compositions of the invention may comprise further additives D6) which further improve the performance and/or esthetic properties. In general, preferred compositions comprise, in addition to the aforementioned components, at least one further additive selected from electrolytes, pH modifiers, perfume carriers, bitter substances, fluorescers, hydrotropes, antiredeposition agents, optical brighteners, graying inhibitors, antishrink agents, anticrease agents, (optionally further) dye transfer inhibitors, antimicrobial active ingredients, antioxidants, antiyellowing agents, corrosion inhibitors, antistats, ironing aids, hydrophobizing and impregnating agents, antiswell and antislip agents, and UV absorbers.

As already mentioned above, particularly suitable dye transfer inhibitors are homopolymers or copolymers which comprise at least one copolymerized monomer selected from N-vinylpyrrolidone, N-vinylcaprolactam, N-vinylimidazole, 2-vinylpyridine, 4-vinylpyridine, salts of the three last-mentioned monomers, 4-vinylpyridine N-oxide, N-carboxymethyl-4-vinylpyridinium halides and mixtures thereof.

Particularly suitable graying inhibitors and/or washing power enhancers are:
  carboxymethyl cellulose,
  graft polymers of vinyl acetate onto carbohydrates, for example onto degraded starch,
  graft polymers of vinyl acetate onto polyethylene glycol,
  alkoxylated oligo- and polyamines, e.g. ethoxylated hexamethylenediamine, which can additionally also be in quaternized and/or sulfated form, or alkoxylated polyethyleneimine with 16 to 24 EO per NH,
  copolymers based on styrene and maleic acid, which can additionally also be modified with terminally capped polyethylene glycol,
  copolymers based on styrene and acrylic acid.

In order to improve the esthetic impression of the washing, cleaning or dishwashing compositions of the invention, they can be colored using suitable dyes. Preferred dyes, the selection of which presents no difficulty whatsoever to the person skilled in the art, have a high storage stability and insensitivity with respect to the other ingredients of the compositions and to light, and do not have any marked substantivity toward textile fibers, in order not to stain them.

The washing, cleaning or dishwashing compositions of the invention may comprise at least one bitter substance. Bitter substances are specifically used to prevent accidental swallowing of the compositions, for example by small children. Suitable bitter substances are known to the person skilled in the art. These include, for example, denatonium benzoate (benzyldiethyl(2,6-xylylcarbamoyl)methylammonium benzoate), the most bitter-tasting substance that is known to date and sold commercially under the name Bitrex®.

It is also possible to add 0.05% to 0.5% by weight of an unmodified polyethyleneimine to the washing, cleaning or dishwashing compositions (preferably liquid washing compositions) of the invention.

It is also possible to add modified polyethyleneimine to the washing, cleaning or dishwashing compositions (preferably liquid washing compositions) of the invention, preferably in an amount of up to 5% by weight (based on the total formulation).

The polyethyleneimine polymer has here a polyethyleneimine base skeleton with a molecular weight of about 300 to about 10000, a weight-average molecular weight, preferably of about 400 to about 7500, a weight-average molecular weight and preferably about 500 to about 5000 preferably of about 500 to 2500 weight-average molecular weight with a distribution Q in the range from 1.0 to 4.5.

The modification to the polyethyleneimine base skeleton comprises one or two alkoxylation modifications per nitrogen atom, depending on whether the modification occurs on an internal nitrogen atom or on a terminal nitrogen atom in the polyethyleneimine base skeleton, the alkoxylation modification consisting of the replacement of a hydrogen atom on a polyalkoxylene chain with an average of about 1 to about 40 ethylene oxide (EO), propylene oxide (PO), butylene oxide (BuO). Preference is given to using EO and/or PO.

The present invention also further provides a process for producing a mixture of the invention by adding an aqueous solution of at least one quaternary ammonium salt (QA) to an aqueous solution of at least one 1-vinylimidazole-containing polymer (P) and subsequent mixing.

For example, the aqueous solution of at least one quaternary ammonium salt (QA) can be added in the cooling phase after polymerization. The aqueous solution of at least one quaternary ammonium salt (QA) can equally also be added during the dilution of the mixture (to adjust the solids content). Furthermore, the aqueous solution of at least one quaternary ammonium salt (QA) can also be added later in the storage or transport tank, for example by online metering.

Combinations of these variants are also conceivable, for example adding a partial amount of the aqueous solution of at least one quaternary ammonium salt (QA) in the cooling phase after polymerization and also adding a further partial amount of the aqueous solution of at least one quaternary ammonium salt (QA) during the dilution of the mixture.

The present invention also further provides a process for stabilizing 1-vinylimidazole-containing polymers (P) by adding at least one quaternary ammonium salt (QA) and for the use of at least one quaternary ammonium salt (QA) for stabilization of 1-vinylimidazole-containing polymers (P).

Moreover, the present invention further provides for the use of at least one quaternary ammonium salt (QA) for stabilization of liquid washing-composition formulations comprising 1-vinylimidazole-containing polymers (P).

Apart from that, the mixture of the invention can also be used for textile finishing (finishing and textile care) and for treatment of cellulose and cotton fibers (including nonwovens). The mixtures of the invention are likewise suitable, inter alia, for textile dyeing (e.g. as constituent of a leveling agent or stripping agent or aftersoaping agent) and textile printing.

Description of the Polymerization Process for Preparation of the Polymers (P)

The polymerization of the monomers usually takes place in an inert gas atmosphere, for example nitrogen, argon or helium. In general, good mixing of the reactants is ensured during the polymerization. The polymerization is carried out especially in water or mixtures of water and at least one $C_1$ to $C_4$ alcohol (in any ratio as solvent). Suitable alcohols are methanol, ethanol, n-propanol, isopropanol, n-butanol, tert-butanol and isobutanol. Of the alcohols, preference is given to using isopropanol.

In a preferred embodiment, the monomers are polymerized in the presence of up to 50% by weight of polyalkylene glycols (based on the mass of the monomers used), especially in the presence of up to 50% by weight of polyethylene glycols (based on the mass of the monomers used). Preference is given to using polyethylene glycols having a molar mass of 200 g/mol up to 10 000 g/mol.

The polymerization temperature is preferably in the range from 50° C. to 100° C. If the polymerization is carried out at higher temperatures, for example at temperatures up to 150° C., it is performed in apparatus sealed in a pressure-tight manner.

The monomers are free-radically polymerized, i.e. compounds which form free radicals under the polymerization conditions are required to initiate homo- and copolymerization. Such free radical-forming initiators are all customary peroxy and azo compounds, e.g. peroxides, hydroperoxides and peroxyesters such as hydrogen peroxide, dibenzoyl peroxide, di-tert-butyl peroxide, tert-butyl hydroperoxide, tert-butyl peroxypivalate and tert-butyl peroxy-2-ethylhexanoate and azo compounds such as 2,2'-azobis(2-amidinopropane) dihydrochloride, 2,2'-azobis[2-(2-imidazolin-2-yl)propane]dihydrochloride, 2,2'-azobisisobutyronitrile, 2,2'-azobis(2-methylbutyronitrile) and dimethyl 2,2'-azobis(2-methylpropionate). It is of course also possible to use initiator mixtures or the known redox initiators (e.g. tert-butyl hydroperoxide/sodium bisulfite). The initiators are used in the customary amounts, for example in amounts of 0.2% to 6% by weight, based on the monomers to be polymerized. If the polymerization is carried out in water or in mixtures of water and at least one of the abovementioned alcohols as solvent, preference is given to using water-soluble azo initiators.

The polymerization is preferably carried out in the presence of polymerization regulators which preferably comprise sulfur in bound form. Compounds of this kind are, for example, inorganic hydrogensulfites, disulfites and dithionites or organic sulfides, disulfides, polysulfides, sulfoxides, sulfones and mercapto compounds. The following polymerization regulators are mentioned as examples: di-n-butyl sulfide, di-n-octyl sulfide, diphenyl sulfide, thiodiglycol, ethylthioethanol, diisopropyl disulfide, di-n-butyl disulfide, di-n-hexyl disulfide, diacetyl disulfide, diethanol sulfide, di-tert-butyl trisulfide and dimethyl sulfoxide. Compounds used with preference as polymerization regulators are mercapto compounds, dialkyl sulfides, dialkyl disulfides and/or diaryl sulfides. Examples of these compounds are ethyl thioglycolate, cysteine, 2-mercaptoethanol, 1,3-mercaptopropanol, 3-mercaptopropane-1,2-diol, 1,4-mercaptobutanol, mercaptoacetic acid, 3-mercaptopropionic acid, mercaptosuccinic acid, thioglycerol, thioacetic acid, thiourea and alkyl mercaptans such as n-butyl mercaptan, n-hexyl mercaptan or n-dodecyl mercaptan. Polymerization regulators used with particular preference are mercaptoalcohols and mercaptocarboxylic acids. The polymerization regulators which comprise sulfur in bound form are used in amounts of 0.1% to 15%, preferably 0.3% to 10% by weight, based on the monomers used in the polymerization. Mixtures of the polymerization regulators to be used can of course also be used in the polymerization.

The monomers can be polymerized by the customary processing techniques, for example by so-called batch polymerization, in which the monomers, optionally regulators and initiators are initially charged in a solvent and heated to the polymerization temperature. The reaction mixture is stirred at the polymerization temperature until the conversion is more than 99%. In this process, the initiator can optionally also be added only after the polymerization temperature has been reached.

Further process variants for polymerization are the feed methods, which are preferably used. In these process variants, a solution of the preferred polymerization regulator comprising sulfur in bound form and an initiator solution are added continuously or in portions to the mixture of monomers and a solvent at the polymerization temperature within a certain time. However, it is also possible to meter a mixture of regulator and initiator into the initial charge heated to polymerization temperature. Another method consists in adding the initiator to the initial charge below or at the polymerization temperature and to only add the regulator or a solution of the regulator to the reaction mixture within a specified time after the polymerization temperature has been reached. A further variant of the feed technique consists in heating the initial charge to a temperature at which the polymerization takes place and then adding regulator, initiator and monomers in separate feeds or together. In this technique, water or a mixture of water, monomer and/or initiator and/or regulator is preferably used as initial charge. According to the invention, particular preference is given to a procedure in which the polymerization regulators preferably comprising sulfur in bound form are added continuously or in portions during the polymerization of the monomers. If the monomers are polymerized in the presence of polyalkylene glycols, the polyalkylene glycols are preferably initially charged and are therefore part of the initial charge.

The solutions which form during the polymerization can be subjected to physical or chemical deodorization following the polymerization process. This is understood to mean, inter alia, an aftertreatment of the polymer solution by means of steam distillation or stripping with nitrogen, with steam being used to remove volatile impurities from the solution. In the case of a chemical aftertreatment, polymerization initiators or mixtures of multiple polymerization initiators are added and the polymer solution is optionally heated to temperatures above the polymerization temperature. Polymer solutions low in residual monomers are obtained especially by chemical aftertreatment.

The polymers can be isolated from the aqueous polymerization medium, for example by spraydrying or spraygranulation. Other drying methods, for example evaporating the polymer solution and grinding the residue or freezedrying, are also possible.

Comonomers (A)

In one embodiment of the invention, the polymers (P) may comprise vinyl esters as comonomers (A) in addition to vinylimidazole. Preferred vinyl esters here are selected from the list consisting of vinyl acetate, vinyl propionate, vinyl laurate and mixtures thereof.

In one embodiment of the invention, the polymers (P) may comprise vinyl ethers as comonomers (A) in addition to vinylimidazole. Preferred vinyl ethers here are selected from the list consisting of methyl vinyl ether, ethyl vinyl ether, butyl vinyl ether, 2-ethylhexyl vinyl ether and mixtures thereof.

In one embodiment of the invention, the polymers (P) may comprise 1-alkenes as comonomers (A) in addition to vinylimidazole. Preferred 1-alkenes here are selected from the list consisting of isobutene, 1-hexene, 2-methyl-1-pentene, 1-octene, 2,4,4-trimethylpentene, $C_{18}$-alkene and mixtures thereof.

In one embodiment of the invention, the polymers (P) may comprise N,N-dialkylacrylamides as comonomers (A) in addition to vinylimidazole. Preferred N,N-dialkylacrylamides here are selected from the list consisting of N,N-dimethyllacrylamide, N,N-diethylacrylamide and mixtures thereof.

In one embodiment of the invention, the polymers (P) may comprise (meth)acrylates as comonomers (A) in addition to vinylimidazole. Preferred (meth)acrylates here are selected from the list consisting of methyl (meth)acrylate, ethyl (meth)acrylate and mixtures thereof.

List of Basic Monomers

In one embodiment of the invention, the polymers (P) may comprise basic comonomers (A) in addition to vinylimidazole.

These are monomers which comprise a basic nitrogen atom, either in the form of the free bases or in quaternized form, and monomers which have an amido group which may optionally be substituted. Suitable monomers of this type are, for example, N,N'-dialkylaminoalkyl (meth)acrylates, e.g. dimethylaminoethyl (meth)acrylate, diethylaminoethyl (meth)acrylate, dimethylaminopropyl (meth)acrylate, diethylaminopropyl (meth)acrylate, dimethylaminobutyl (meth)acrylate, dimethylaminoneopentyl (meth)acrylate. Further suitable basic monomers of this group are N,N'-dialkylaminoalkyl(meth)acrylamides, e.g. N,N'-di-C1-to-C3-alkylamino-C2-to-C6-alkyl(meth)acrylamides, such as dimethylaminoethyl(meth)acrylamide, diethylaminoethyl(meth)acrylamide, dipropylaminoethyl(meth)acrylamide, dimethylaminopropyl(meth)acrylamide, diethylaminopropyl(meth)acrylamide, dimethylaminoneopentyl(meth)acrylamide and dialkylaminobutylacrylamide.

Further suitable monomers of this group are alkylvinylimidazoles such as 2-methyl-1-vinylimidazole, 4-vinylpyridine, 2-vinylpyridine, 1-vinyltriazole and diallyl(di) alkylamines in which the alkyl group has 1 to 12 carbon atoms. In the copolymerization, the abovementioned basic monomers are used in the form of the free bases, of the salts with organic or inorganic acids or in quaternized form. Suitable for salt formation are, for example, carboxylic acids having 1 to 7 carbon atoms, e.g. formic acid, acetic acid or propionic acid, benzenesulfonic acid, ptoluenesulfonic acid, methanesulfonic acid or inorganic acids such as hydrohalic acids, e.g. hydrochloric acid.

The basic monomers mentioned above as examples may also be used in quaternized form.

Suitable for quaternization are, for example, alkyl halides having 1 to 18 carbon atoms in the alkyl group, e.g. methyl chloride, methyl bromide, methyl iodide, ethyl chloride, propyl chloride, hexyl chloride, dodecyl chloride, lauryl chloride, and benzyl halides, especially benzyl chloride.

The quaternization of the nitrogen-containing basic monomers can also be performed by reacting these compounds with dialkyl sulfates, especially diethyl sulfate or dimethyl sulfate. Examples of quaternized monomers of this group are trimethylammoniummethyl methacrylate chloride, dimethylethylammoniumethyl methacrylate ethylsulfate and dimethylethylammoniumethylmethacrylamide ethylsulfate.

Further suitable quaternized monomers are 1-vinylimidazolium compounds. Examples of quaternized 1-vinylimidazoles are 3-methyl-1-vinylimidazolium chloride, 3-methyl-1-vinylimidazolium methylsulfate, 3-benzyl-1-vinylimidazalium chloride, 3-n-dodecyl-1-vinylimidazolium chloride and 3-n-octadecyl-1-vinylimidazolium chloride.

The quaternization may also be effected in a polymer-analogous manner by reacting the polymers comprising basic monomers with the alkylating agents listed above, for example.

Monomers Containing Alkylene Oxide Groups

In one embodiment of the invention, the polymers (P) may comprise comonomers (A) containing alkylene oxide groups in addition to vinylimidazole.

This comonomer type is described by the following formulae (I.a) or (I.b):

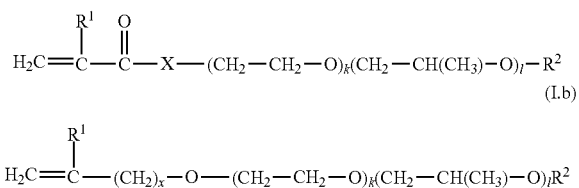

in which:
the sequence of the alkylene oxide units is as desired
x is 0, 1 or 2,
k and l are independently of one another integers from 0 to 100, the sum total of k and l being at least 2, preferably at least 5,
$R^1$ is hydrogen or $C_1$-$C_8$-alkyl,
$R^2$ is hydrogen, $C_1$-$C_{30}$-alkyl, $C_2$-$C_{30}$-alkenyl or $C_5$-$C_8$-cycloalkyl, and
X is O or a group of the formula $NR^3$ in which $R^3$ is H, alkyl, alkenyl, cycloalkyl, heterocycloalkyl, aryl or hetaryl.

EXAMPLES

Experimental examples illustrating some aspects of the present invention are described below.

The polymers as per Table 1 below were synthesized as follows.

Example P1

In a 1.5 L polymerization apparatus, a mixture of 15 g of 1-vinylpyrrolidone, 5 g of 1-vinylimidazole, 0.3 g of mercaptoethanol and 85 g of water is heated to a temperature of 62° C. under stirring and nitrogen blanketing. After this temperature has been reached, a mixture of 258 g of 1-vinylpyrrolidone, 12 g of 1-vinylimidazole, 2.9 g of mercaptoethanol and 485 g of water, as feed 1, and a solution of 5.8 g of 2,2'-azobis[2-(2-imidazolin-2-yl)propane]dihydrochloride in 100 g of water, as feed 2, are metered in within 3 hours. The reaction mixture is subsequently stirred at 62° C. for 30 minutes and then admixed with an aqueous solution of 1.5 g of 2,2'-azobis[2-(2-imidazolin-2-yl)propane]dihydrochloride in 10 g of water within 5 minutes and stirred at 62° C. for 2.5 hours. 980.5 g of a yellow, clear aqueous polymer solution are obtained. The solids content of the polymer solution is 30.3%.

Example P2

In a 1.5 L polymerization apparatus, a mixture of 15 g of 1-vinylpyrrolidone, 5 g of 1-vinylimidazole, 0.3 g of mercaptoethanol and 85 g of water is heated to a temperature of 62° C. under stirring and nitrogen blanketing. After this temperature has been reached, a mixture of 230 g of 1-vinylpyrrolidone, 40 g of 1-vinylimidazole, 2.9 g of mercaptoethanol and 485 g of water, as feed 1, and a solution of 5.8 g of 2,2'-azobis[2-(2-imidazolin-2-yl)propane]dihydrochloride in 100 g of water, as feed 2, are metered in within 3 hours. The reaction mixture is subsequently stirred at 62° C. for 30 minutes and then admixed with an aqueous solution of 1.5 g of 2,2'-azobis[2-(2-imidazolin-2-yl)propane]dihydrochloride in 10 g of water within 5 minutes and stirred at 62° C. for 2.5 hours. 989 g of a yellow, clear aqueous polymer solution are obtained. The solids content of the polymer solution is 30.4%.

Example P3

In a 1.5 L polymerization apparatus, a mixture of 10 g of 1-vinylpyrrolidone, 10 g of 1-vinylimidazole, 0.3 g of mercaptoethanol and 85 g of water is heated to a temperature of 62° C. under stirring and nitrogen blanketing. After this temperature has been reached, a mixture of 193 g of 1-vinylpyrrolidone, 77 g of 1-vinylimidazole, 2.2 g of mercaptoethanol and 485 g of water as is feed 1, and after a time delay of 5 minutes, the metering of feed 2 (a solution of 4.0 g of 2,2'-azobis[2-(2-imidazolin-2-yl)propan]dihydrochloride in 100 g of water) is started, which is completed within 3 hours. The reaction mixture is subsequently stirred at 62° C. for 30 minutes and then admixed with an aqueous solution of 1.5 g of 2,2'-azobis[2-(2-imidazolin-2-yl)propane]dihydrochloride in 10 g of water within 5 minutes and stirred at 62° C. for 2.5 hours. 987.1 g of a yellow, clear aqueous polymer solution are obtained. The solids content of the polymer solution is 30.7%.

Example P4

In a 1.5 L polymerization apparatus, a mixture of 10 g of 1-vinylpyrrolidone, 10 g of 1-vinylimidazole, 0.3 g of mercaptoethanol and 85 g of water is heated to a temperature of 62° C. under stirring and nitrogen blanketing. After this temperature has been reached, a mixture of 193 g of 1-vinylpyrrolidone, 77 g of 1-vinylimidazole, 2.9 g of mercaptoethanol and 485 g of water, as feed 1, and a solution of 5.8 g of 2,2'-azobis[2-(2-imidazolin-2-yl)propane]dihydrochloride in 100 g of water, as feed 2, are metered in within 3 hours. The reaction mixture is subsequently stirred at 62° C. for 30 minutes and then admixed with an aqueous solution of 1.5 g of 2,2'-azobis[2-(2-imidazolin-2-yl)propane]dihydrochloride in 10 g of water within 5 minutes and stirred at 62° C. for 2.5 hours. 986.5 g of a yellow, clear aqueous polymer solution are obtained. The solids content of the polymer solution is 30.7%.

Example P5

125 g of 1-vinylpyrrolidone, 125 g of 1-vinylimidzole and 500 g of water are initially charged in a 1.5 L stirred apparatus and heated to 75° C. under nitrogen blanketing and stirring. Once the reaction mixture has reached a temperature of 75° C., a solution of 5.0 g of 2,2'-azobis(2-amidinopropane) dihydrochloride in 50 ml of water is metered as feed 1 within 120 minutes and a solution of 6.0 g of mercaptoethanol in 50 ml of water is metered as feed 2 within 100 minutes. After the metering of the initiator has ended, the reaction mixture is stirred at a temperature of 75° C. for 30 minutes and subsequently admixed with 1.0 g of 2,2'-azobis(2-amidinopropane) dihydrochloride and stirred at 75° C. for a further 2 hours. 860.5 g of a yellow, clear aqueous polymer solution are obtained. The solids content of the polymer solution is 30.4%.

Example P6

Example P5 is repeated with the exception that a solution of 5.0 g of 2,2'-azobis(2-amidinopropane) dihydrochloride in 50 ml of water is metered in as feed 1 within 90 minutes and a solution of 10.0 g of mercaptoethanol in 50 ml of water is metered in as feed 2 within 60 minutes. 861.1 g of a yellow polymer solution are obtained. The solids content of the polymer solution is 30.5%.

Example P7

19.5 kg of 1-vinylpyrrolidone and 19.5 kg of 1-vinylimidzole in 75 kg of water are initially charged in a 200 L stirred apparatus. The apparatus is evacuated (25 mbar) twice while stirring and pressurized with nitrogen while the solution is heated to 85° C. Once the reaction mixture reached a temperature of 85° C., feed 1 (a solution of 375 g of 2,2'-azobis(2-amidinopropane) dihydrochloride in 9 L of water) is metered within 3 h. Feed 2 is started 30 minutes before feed 1 is ended, this being a solution of 450 g of mercaptoethanol in 9 L of water. Feed 2 is metered continuously within 2 h. Thereafter, the reaction mixture is additionally stirred at 85° C. for 30 minutes, followed by 1.5 L of a 10% solution of 2,2'-azobis(2-amidinopropane) dihydrochloride and a 2-hour stirring time at 75° C. 131.1 kg of a yellow, clear aqueous polymer solution is obtained. The solids content of the polymer solution is 30.5%.

Example P8 (Polymerization of 1-Vinylimidazole and 1-Vinylpyrrolidone in the Presence of PEG)

In a 200 L polymerization apparatus, a mixture of 16 kg of polyethylene glycol having a molar mass of 600 g/mol and 80 kg of water is heated to a temperature of 80° C. under stirring and nitrogen blanketing. After this temperature has been reached, 40 kg of 1-vinylpyrrolidone are started as feed 1, the metering rate being selected for metering within 3 h. After a delay of 20 minutes, what are started are feed 2 consisting of 20 kg of 1-vinylimidzole (metering within 3 h) and, in parallel, feed 3 consisting of a solution of 1200 g of 2,2'-azobis(2-amidinopropane) dihydrochloride in 22 kg of water, which is dosed within 3.5 hours. The reaction mixture is subsequently stirred at 80° C. for 30 minutes and then admixed with an aqueous solution of 120 g of 2,2'-azobis (2-amidinopropane) dihydrochloride in 2.2 kg of water within 5 minutes and stirred at 80° C. for 2.5 hours. A yellow, clear and low-odor aqueous polymer solution is obtained after cooling. The solids content of the polymer solution is 40.7%.

Example P9 (poly-1-vinylimidazole, homopolymer) In a polymerization apparatus, a mixture of 300 g of 1-vinylimidazole and 400 g of water is heated to a temperature of 80° C. under stirring in a nitrogen atmosphere. After this temperature has been reached, a solution of 9 g of mercaptoethanol in 50 g of water is metered in as feed 1 within 2 hours and a solution of 7.5 g of azobis(2-methylbutyronitrile) in 70 g of isopropanol is metered in as feed 2 within 3 hours. Thereafter, the reaction mixture is stirred at a temperature of 80° C. for 1 hour and then admixed with a solution of 1.5 g of azobis(2-methylbutyronitrile) in a little isopropanol and the reaction mixture is stirred at 80° C. for a further 3 hours. The isopropanol is then removed from the reaction mixture with the aid of steam distillation. A yellow, clear and low-odor aqueous polymer solution is obtained. The homopolymer of the 1-vinylimidazole has a molecular weight of 25 300 g/mol. The solids content of the polymer solution is 41.6%.

| | The following polymers were used for the tests described below (Table 1): | | | | | |
|---|---|---|---|---|---|---|
| | VI [% fraction of polymer] | VP [% fraction of polymer] | Molar mass Mw GPC | MW/Mn | % water | 3rd component PEG(EO) |
| P1 | 5.8 | 94.2 | 16 300 | 3.2 | 69.6 | — |
| P2 | 15 | 85 | 23 850 | 3.8 | 69.7 | — |
| P3 | 30 | 70 | 49 480 | 5.4 | 69.3 | — |
| P4 | 30 | 70 | 25 180 | 3.7 | 69.3 | — |
| P5 | 50 | 50 | 35 860 | 4.9 | 69.6 | — |
| P6 | 50 | 50 | 19 100 | 3.8 | 69.5 | — |
| P7 | 50 | 50 | 63 550 | 6.7 | 69.5 | — |
| P8 | 26 | 53 | 76 000 | 7.8 | 59.3 | 21 |
| P9 | 100 | 0 | 22 300 | 3.0 | 58.4 | — |

Molar mass determination by SEC (size-exclusion chromatography) was carried out under the following conditions.

The column (NOVEMA Max Ultrahigh) had a length of 30 cm with a diameter of 8 mm. The separation material used was a modified acrylate copolymer network.

The eluent used was 0.1% (w/w) trifluoroacetic acid/0.1 M NaCl in distilled water. The column temperature was 35° C. and the flow rate was 0.5 ml/min. 100 µl were injected at a concentration of 1.5 mg/ml. The sample solutions were filtered across a Sartorius Minisart RC 25 (0.2 µm).

Samples are generally dissolved in the SEC eluent. The detector was a DRI Agilent 1100 UV GAT-LCD 503 [232 nm].

The calibration was carried out using narrow-distribution poly(2-vinylpyridine) standards from PSS, Germany, having molecular weights from M=620 to M=2 890 000. In addition, pyridine having a molecular weight of M=79 was used. Values outside this elution range were extrapolated.

Stability of Preservatives in VI-Containing Polymers:

The following stabilizers for VI-containing polymers (here: aqueous solution of a copolymer of vinylpyrrolidone and vinylimidazole) were tested.

(Selected) conventional stabilizers:
MIT=methylisothiazolinone; methyl-4-isothiazolin-3-one
BIT=benzisothiazolinone; 1,2-benzisothiazolin-3-one
CMIT=chloromethylisothiazolinone; 5-chloro-N-methyl-isothiazolin-3-one
OIT=octylisothiazolinone
DCOIT=dichloroctylisothiazolinone
Selected stabilizers of the invention that are based on quaternary ammonium salts:
DDAC=didecyldimethylammonium chloride
BAC=benzalkonium chloride
16-BAC=cetylalkonium chloride
CPC=cetylpyridinium chloride Analysis of active substance: Results for active-substance concentration before and after storage at 40° C. (14 days, 28 days): [ppm]

MIT, BIT, CMIT, OIT, DCOIT and iodopropynyl butyl carbamate were determined by RP chromatography with UV detection after dilution of the sample to be tested. An RP18 column was used for this purpose, with an eluent composed of an acid-methanol mixture under isocratic conditions.

Quaternary ammonium salts, i.e. DDAC, BAC, 16-BAC and CPC, were determined by LC chromatography with a water/formic acid/ammonium formate eluent.

Iodine color number according to DIN 6162:2014-09

Physical stability; visual assessment according to:

++=no discernible change with respect to color, turbidity or phase separation; +=marginal change in color number, somewhat increased Tyndall effect but no turbidity; 0=easily discernible increase in color number and moderate turbidity–no phase separation; – turbidity and change in color number readily discernible by visual assessment; – – strong color change with strong turbidity and incipient phase separation.

Before storage, all batches could be rated ++ (no turbidity or phase separation; no influence of the biocide on the color number of the product).

Microbiological results at the start (freshly formulated, i.e. 4-week test series is started immediately) and after 60 days of storage at 40° C. (i.e. the 4-week microbial testing is started with the sample stored at 40° C. for 60 days)

The test described below is carried out in order to ascertain the preserving effect of chemical preservatives in aqueous products and systems, the principle of the described method reflecting the efficacy of chemical preservatives with respect to pot-maintenance of aqueous products/systems under conditions corresponding to the use of laundry products/consumer products by the consumer. For this purpose, the preservatives to be tested are added in those concentrations which correspond to from the literature or to the manufacturer data from the suppliers (e.g. Thor, Speyer). In said test, our orientation was toward the upper range, which, with the exception of VI-containing polymers, had always led to excellent results in the case of aqueous polymers for laundry.

A constant microorganism load is achieved by periodic inoculation of the test batches. Before the swabs of each batch made respectively immediately in parallel with the inoculation. The assessment is made on the basis of the microbial growth of the streaks. A preservative is more effective, the longer it takes until microbial growth first appears.

When carrying out said tests, 25 g of the polymer to be tested are weighed in each case into a vessel with a screw cap. The preservatives to be tested are each added in separate batches according to the specified use concentrations. An unpreserved product sample was used in each case for the growth control. Two days after the addition of the preservative, the samples are infected with 0.5 ml of inoculum (2% w/w). The titer of this inoculant solution is $10^9$ organisms per ml. The following microorganisms are the test organisms for the preservation test:

Bacteria:
  *Escherichia coli*
  *Staphylococcus aureus*
  *Pseudomonas aeruginosa*
  *Pseudomonas putida*
  *Burkholderia cepacia*
  *Alcaligenes faecalis*
Yeast:
  *Candida albicans*
  *Candida valida*
  *Rhodotorula rura*
  *Saccharomyces cerevisiae*

The test batches are inoculated four times altogether and once a week and are streaked on an agar plate once a week; the first streaking is done immediately before the new inoculation. Microbial growth on the agar surface is assessed after a three-day incubation at 25° C. As a precaution, negative swabs are additionally observed for a further three days and reassessed. The preserving effect is effected in a semiquantitative method via the growth of the individual streaks in accordance with the assessment from – via + to +++. The preservative result is repeatedly demonstrably robust, i.e. +++– defines the microbial growth.

When assessing the results, it is assumed that a preservative can be regarded as good if there are batches under the above-described laboratory conditions for a period of four weeks without microbial invasion of the sample, and that, even after the fourth inoculation, no microbial attacks occur growth can be identified.

– –: no growth
–: slight growth, max. 100 colonies
0: moderate growth, max. 400 colonies
+: uniform growth with individual colonies still easily identifiable
++: strong growth; too many colonies to be counted, already some extensive growth The test for ten weeks shows the surprising rise in activity of the preparations of the invention, i.e. extension of ten inoculation cycles.

The following tables provide an overview of the test results.

TABLE 2 a

| Polymer P5 (HP56) | 0 d, RT | 14 d, 40° C. | 28 d, 40° C. | 60 d, 40° C. | Iodine color number, start | Iodine color number, 60 d 40° C. | Physical stability, 60 d 40° C.* | Start sample measurement, bact. assess., 4th inoculation | 60 d 40° C., bact. assess., 4th inoculation | Start sample measurement, yeast assess., 4th inoculation | 60 d 40° C., yeast assess., 4th inoculation |
|---|---|---|---|---|---|---|---|---|---|---|---|
| MIT | 250 | 151 | 119 | 94 | 3.6 | 8.7 | – | – – | + | – – | ++ |
| BIT | 150 | 101 | 85 | 69 | 3.6 | 10.4 | – | – – | ++ | – | ++ |
| CMIT | 150 | 94 | 81 | 59 | 3.5 | 9.0 | – – | – – | + | – | ++ |
| OIT | 250 | 142 | 89 | 72 | 3.4 | 9.7 | – – | – | ++ | 0 | ++ |
| DCOIT | 300 | 230 | 180 | 94 | 3.6 | 8.7 | – – | – – | + | – | ++ |
| Iodopropynyl butyl carbamate | 250 | 206 | 176 | 84 | 3.4 | 11.7 | – | – | + | – | + |
| DDAC | 950 | 950 | 940 | 940 | 3.3 | 3.3 | ++ | – – | – – | – – | – – |
| BAC | 1000 | 990 | 90 | 970 | 3.3 | 3.3 | + | – – | – – | – – | – – |

TABLE 2 a-continued

| Polymer P5 (HP56) | 0 d, RT | 14 d, 40° C. | 28 d, 40° C. | 60 d, 40° C. | Iodine color number, start | Iodine color number, 60 d 40° C. | Physical stability, 60 d 40° C.* | Start sample measurement, bact. assess., 4th inoculation | 60 d 40° C., bact. assess., 4th inoculation | Start sample measurement, yeast assess., 4th inoculation | 60 d 40° C., yeast assess., 4th inoculation |
|---|---|---|---|---|---|---|---|---|---|---|---|
| 16-BAC | 1000 | 960 | 960 | 940 | 3.4 | 3.3 | + | -- | -- | - | - |
| CPC | 1000 | 940 | 940 | 910 | 3.4 | 3.4 | + | -- | - | - | 0 |

TABLE 2 b

| Polymer P4 | 0 d, RT | 14 d, 40° C. | 28 d, 40° C. | 60 d, 40° C. | Iodine color number, start | Iodine color number, 60 d 40° C. | Physical stability, 60 d 40° C.* | Start sample measurement, bact. assess., 4th inoculation | 60 d 40° C., bact. assess., 4th inoculation | Start sample measurement, yeast assess., 4th inoculation | 60 d 40° C., yeast assess., 4th inoculation |
|---|---|---|---|---|---|---|---|---|---|---|---|
| MIT | 250 | 164 | 136 | 113 | 3.4 | 8.7 | - | -- | + | -- | ++ |
| BIT | 150 | 117 | 93 | 82 | 3.4 | 9.2 | - | -- | + | - | ++ |
| CMIT | 150 | 111 | 89 | 73 | 3.2 | 8.9 | -- | -- | + | - | + |
| OIT | 250 | 165 | 114 | 90 | 3.3 | 9.7 | -- | -- | - | ++ | 0 | ++ |
| DCOIT | 300 | 246 | 198 | 123 | 3.4 | 8.9 | - | -- | + | - | ++ |
| Iodopropynyl butyl carbamate | 250 | 212 | 188 | 101 | 3.4 | 10.0 | - | -- | 0 | - | ++ |
| DDAC | 950 | 950 | 942 | 940 | 3.3 | 3.3 | ++ | -- | -- | -- | -- |
| BAC | 1000 | 1000 | 991 | 977 | 3.2 | 3.3 | + | -- | -- | -- | -- |
| 16-BAC | 1000 | 964 | 960 | 944 | 3.1 | 3.3 | + | -- | - | - | - |
| CPC | 1000 | 948 | 938 | 914 | 3.1 | 3.2 | + | -- | 0 | - | 0 |

TABLE 2 c

| Polymer P3 | 0 d, RT | 14 d, 40° C. | 28 d, 40° C. | 60 d, 40° C. | Iodine color number, start | Iodine color number, 60 d 40° C. | Physical stability, 60 d 40° C.* | Start sample measurement, bact. assess., 4th inoculation | 60 d 40° C., bact. assess., 4th inoculation | Start sample measurement, yeast assess., 4th inoculation | 60 d 40° C., yeast assess., 4th inoculation |
|---|---|---|---|---|---|---|---|---|---|---|---|
| MIT | 250 | 171 | 140 | 122 | 3.4 | 8.5 | - | - | + | -- | ++ |
| BIT | 150 | 119 | 99 | 80 | 3.4 | 9.3 | - | - | ++ | - | ++ |
| CMIT | 150 | 117 | 93 | 77 | 3.2 | 8.5 | - | -- | + | - | ++ |
| OIT | 250 | 163 | 121 | 96 | 3.3 | 9.2 | -- | -- | ++ | 0 | ++ |
| DCOIT | 300 | 232 | 183 | 112 | 3.4 | 9.1 | -- | -- | + | - | ++ |
| Iodopropynyl butyl carbamate | 250 | 221 | 190 | 107 | 3.4 | 10.4 | - | - | + | - | + |
| DDAC | 950 | 950 | 940 | 930 | 3.3 | 3.3 | ++ | -- | -- | -- | -- |
| BAC | 1000 | 970 | 973 | 967 | 3.2 | 3.3 | ++ | -- | -- | -- | - |
| 16-BAC | 1000 | 975 | 968 | 952 | 3.1 | 3.3 | + | -- | -- | - | - |
| CPC | 1000 | 960 | 949 | 936 | 3.1 | 3.4 | + | -- | -- | - | 0 |

TABLE 2 d

| Polymer P2 | 0 d, RT | 14 d, 40° C. | 28 d, 40° C. | 60 d, 40° C. | Iodine color number, start | Iodine color number, 60 d 40° C. | Physical stability, 60 d 40° C.* | Start sample measurement, bact. assess., 4th inoculation | 60 d 40° C., bact. assess., 4th inoculation | Start sample measurement, yeast assess., 4th inoculation | 60 d 40° C., yeast assess., 4th inoculation |
|---|---|---|---|---|---|---|---|---|---|---|---|
| MIT | 250 | 181 | 139 | 116 | 2.7 | 5.8 | - | - | + | -- | + |
| BIT | 150 | 112 | 93 | 80 | 2.9 | 7.1 | - | - | ++ | -- | ++ |
| CMIT | 150 | 108 | 89 | 66 | 3.1 | 8.6 | -- | -- | + | - | + |
| OIT | 250 | 170 | 101 | 84 | 3.0 | 8.0 | -- | -- | + | - | ++ |

TABLE 2 d-continued

| Polymer P2 | 0 d, RT | 14 d, 40° C. | 28 d, 40° C. | 60 d, 40° C. | Iodine color number, start | Iodine color number, 60 d 40° C. | Physical stability, 60 d 40° C.* | Start sample measurement, bact. assess., 4th inoculation | 60 d 40° C., bact. assess., 4th inoculation | Start sample measurement, yeast assess., 4th inoculation | 60 d 40° C., yeast assess., 4th inoculation |
|---|---|---|---|---|---|---|---|---|---|---|---|
| DCOIT | 300 | 244 | 195 | 109 | 3.1 | 8.1 | -- | -- | + | - | + |
| Iodopropynyl butyl carbamate | 250 | 225 | 183 | 122 | 2.8 | 8.0 | - | - | + | - | + |
| DDAC | 950 | 950 | 940 | 940 | 2.9 | 3.0 | ++ | -- | -- | -- | -- |
| BAC | 1000 | 990 | 990 | 970 | 3.0 | 3.2 | + | -- | -- | -- | - |
| 16-BAC | 1000 | 960 | 960 | 940 | 3.0 | 3.1 | + | -- | -- | - | - |
| CPC | 1000 | 940 | 940 | 910 | 3.0 | 3.2 | + | -- | - | - | - |

TABLE 2 e

| Polymer P1 | 0 d, RT | 14 d, 40° C. | 28 d, 40° C. | 60 d, 40° C. | Iodine color number, start | Iodine color number, 60 d 40° C. | Physical stability, 60 d 40° C.* | Start sample measurement, bact. assess., 4th inoculation | 60 d 40° C., bact. assess., 4th inoculation | Start sample measurement, yeast assess., 4th inoculation | 60 d 40° C., yeast assess., 4th inoculation |
|---|---|---|---|---|---|---|---|---|---|---|---|
| MIT | 250 | 217 | 156 | 131 | 2.5 | 5.5 | - | - | + | -- | 0 |
| BIT | 150 | 101 | 85 | 69 | 2.6 | 6.0 | - | - | + | -- | + |
| CMIT | 150 | 94 | 81 | 59 | 2.5 | 6.2 | -- | -- | 0 | - | + |
| OIT | 250 | 142 | 89 | 72 | 2.8 | 5.9 | -- | -- | + | - | + |
| DCOIT | 300 | 244 | 183 | 94 | 3.0 | 6.2 | -- | -- | 0 | - | + |
| Iodopropynyl butyl carbamate | 250 | 206 | 176 | 84 | 2.8 | 7.5 | - | - | 0 | - | + + |
| DDAC | 950 | 950 | 940 | 940 | 2.9 | 2.9 | ++ | -- | -- | -- | -- |
| BAC | 1000 | 990 | 990 | 970 | 2.6 | 2.8 | + | -- | -- | -- | - |
| 16-BAC | 1000 | 960 | 960 | 940 | 2.6 | 2.7 | + | -- | -- | -- | - |
| CPC | 1000 | 940 | 940 | 910 | 2.6 | 2.9 | + | -- | - | - | - |

TABLE 2 f

| Polymer P6 | 0 d, RT | 14 d, 40° C. | 28 d, 40° C. | 60 d, 40° C. | Iodine color number, start | Iodine color number, 60 d 40° C. | Physical stability, 60 d 40° C.* | Start sample measurement, bact. assess., 4th inoculation | 60 d 40° C., bact. assess., 4th inoculation | Start sample measurement, yeast assess., 4th inoculation | 60 d 40° C., yeast assess., 4th inoculation |
|---|---|---|---|---|---|---|---|---|---|---|---|
| MIT | 250 | 143 | 117 | 87 | 3.6 | 8.5 | - | -- | + | -- | ++ |
| BIT | 150 | 99 | 83 | 66 | 3.6 | 10.0 | - | - | + | - | ++ |
| CMIT | 150 | 91 | 76 | 55 | 3.5 | 9.1 | -- | -- | + | - | + |
| OIT | 250 | 135 | 88 | 68 | 3.4 | 9.7 | -- | - | ++ | 0 | ++ |
| DCOIT | 300 | 222 | 184 | 98 | 3.6 | 8.4 | -- | -- | + | - | + |
| Iodopropynyl butyl carbamate | 250 | 201 | 174 | 80 | 3.4 | 11.0 | - | -- | + | - | + |
| DDAC | 950 | 950 | 950 | 943 | 3.3 | 3.3 | ++ | -- | -- | -- | -- |
| BAC | 1000 | 990 | 981 | 976 | 3.3 | 3.4 | + | -- | -- | -- | -- |
| 16-BAC | 1000 | 970 | 961 | 954 | 3.4 | 3.5 | + | -- | -- | - | - |
| CPC | 1000 | 938 | 940 | 919 | 3.4 | 3.6 | + | -- | - | - | 0 |

TABLE 2 g

| Polymer P7 | 0 d, RT | 14 d, 40° C. | 28 d, 40° C. | 60 d 40° C. | Iodine color number, start | Iodine color number, 60 d 40° C. | Physical stability, 60 d 40° C.* | Start sample measurement, bact. assess., 4th inoculation | 60 d 40° C., bact. assess., 4th inoculation | Start sample measurement, yeast assess., 4th inoculation | 60 d 40° C., yeast assess., 4th inoculation |
|---|---|---|---|---|---|---|---|---|---|---|---|
| MIT | 250 | 149 | 123 | 91 | 3.6 | 8.5 | − | −− | + | −− | ++ |
| BIT | 150 | 105 | 88 | 72 | 3.6 | 10.0 | − | −− | ++ | − | ++ |
| CMIT | 150 | 96 | 80 | 64 | 3.5 | 9.1 | − | −− | + | − | ++ |
| OIT | 250 | 139 | 92 | 73 | 3.4 | 9.7 | −− | − | ++ | 0 | ++ |
| DCOIT | 300 | 228 | 189 | 106 | 3.6 | 8.4 | −− | −− | + | − | ++ |
| Iodopropynyl butyl carbamate | 250 | 207 | 178 | 87 | 3.4 | 11.0 | − | −− | + | − | + |
| DDAC | 950 | 947 | 945 | 938 | 3.3 | 3.3 | ++ | −− | −− | −− | −− |
| BAC | 1000 | 988 | 985 | 979 | 3.3 | 3.4 | ++ | −− | −− | −− | −− |
| 16-BAC | 1000 | 975 | 966 | 953 | 3.4 | 3.5 | + | −− | −− | − | − |
| CPC | 1000 | 941 | 944 | 928 | 3.4 | 3.6 | + | −− | − | − | 0 |

TABLE 2 h

| Polymer P8 | 0 d, RT | 14 d, 40° C. | 28 d, 40° C. | 60 d 40° C. | Iodine color number, start | Iodine color number, 60 d 40° C. | Physical stability, 60 d 40° C.* | Start sample measurement, bact. assess., 4th inoculation | 60 d 40° C., bact. assess., 4th inoculation | Start sample measurement, yeast assess., 4th inoculation | 60 d 40° C., yeast assess., 4th inoculation |
|---|---|---|---|---|---|---|---|---|---|---|---|
| MIT | 250 | 151 | 119 | 94 | 3.5 | 8.6 | − | − | + | −− | + |
| BIT | 150 | 101 | 85 | 69 | 3.4 | 10.4 | −− | − | + | −− | + |
| CMIT | 150 | 94 | 81 | 59 | 3.3 | 9.3 | −− | −− | 0 | − | 0 |
| OIT | 250 | 142 | 89 | 72 | 3.3 | 10.0 | −− | −− | + | − | + |
| DCOIT | 300 | 230 | 180 | 94 | 3.4 | 8.9 | −− | −− | + | − | 0 |
| Iodopropynyl butyl carbamate | 250 | 206 | 176 | 84 | 3.4 | 11.4 | − | − | + | − | + |
| DDAC | 950 | 950 | 940 | 940 | 3.3 | 3.3 | ++ | −− | −− | −− | −− |
| BAC | 1000 | 990 | 990 | 970 | 3.3 | 3.4 | + | −− | −− | −− | −− |
| 16-BAC | 1000 | 960 | 960 | 940 | 3.2 | 3.5 | + | −− | −− | −− | − |
| CPC | 1000 | 940 | 940 | 910 | 3.3 | 3.6 | + | −− | −− | − | 0 |

TABLE 2 i

| Polymer P9 | 0 d, RT | 14 d, 40° C. | 28 d, 40° C. | 60 d 40° C. | Iodine color number, start | Iodine color number, 60 d 40° C. | Physical stability, 60 d 40° C.* | Start sample measurement, bact. assess., 4th inoculation | 60 d 40° C., bact. assess., 4th inoculation | Start sample measurement, yeast assess., 4th inoculation | 60 d 40° C., yeast assess., 4th inoculation |
|---|---|---|---|---|---|---|---|---|---|---|---|
| MIT | 250 | 131 | 98 | 80 | 3.9 | 12.7 | − | −− | + | −− | ++ |
| BIT | 150 | 97 | 78 | 60 | 4.0 | 12.8 | − | −− | ++ | − | ++ |
| CMIT | 150 | 82 | 70 | 51 | 3.9 | 13.9 | −− | −− | ++ | − | ++ |
| OIT | 250 | 128 | 76 | 62 | 4.0 | 15.5 | −− | −− | ++ | − | ++ |
| DCOIT | 300 | 219 | 165 | 87 | 3.9 | 14.7 | − | −− | ++ | − | ++ |
| Iodopropynyl butyl carbamate | 250 | 191 | 160 | 78 | 3.9 | 16.9 | − | −− | + | − | + |
| DDAC | 950 | 950 | 944 | 940 | 3.8 | 3.9 | ++ | −− | −− | −− | −− |
| BAC | 1000 | 990 | 985 | 975 | 3.7 | 4.0 | + | −− | −− | −− | −− |
| 16-BAC | 1000 | 960 | 960 | 940 | 3.7 | 3.9 | ++ | −− | −− | −− | − |
| CPC | 1000 | 940 | 940 | 910 | 3.9 | 4.2 | + | −− | −− | − | − |

A good agreement between biocide stability/degradation, color number, and evaluation of physical stability is discerned. The sufficient stability of the inventive combination leads to a sustained microbiological stability as well. The strong interaction and the degradation of the isothiazolinones preferred by the person skilled in the art, but also iodopropynyl butyl carbamate, is surprising, whereas the stability of the quaternized systems is unexpectedly good and, in contrast to what is presumed by the person skilled in the art, it is also possible to prepare highly stable washing-composition formulations (see the description below).

Checking of the Stability of the Stabilized Vinylimidazole-Containing Polymers of the Invention in Washing-Composition Formulations The mixtures of the invention were tested in exemplary liquid washing-composition formulations. As can be gathered from the data below, there was no apparent deterioration in (physical) stability when using the mixtures of the invention comprising VI polymers and quaternary ammonium salts, compared to using the VI polymers without stabilizer.

Composition of the washing-composition formulations:

WM1: 5.5 g of linear alkylbenzenesulfonic acid, 2.4 g of coconut fatty acid K12-18, 7.7 g of C12-C14 alcohol+2 mol EO+sulfate, Na salt (C12-C14 ether sulfate), 2.2 g of KOH, 5.4 g of C13-C15 oxo alcohol+7 mol EO, 6.0 g of 1,2-propylene glycol, 2.0 g of ethanol and water to 90 g WM2: 6.6 g of linear alkylbenzenesulfonic acid, 2.4 g of coconut fatty acid K12-18, 9.3 g of C12-C14 alcohol+2 mol EO+sulfate, Na salt (C12-C14 ether sulfate), 2.5 g of KOH, 3.3 g of C13-C15 oxo alcohol+7 mol EO, 6.0 g of 1,2-propylene glycol, 2.0 g of ethanol and water to 90 g The VI polymers with and without the quaternary ammonium salt preservative were mixed into washing composition WM1 or WM2 under stirring (room temperature, 60 min). The stability and the appearance of the washing compositions were assessed immediately, after 7 days and after 28 days (storage at 25° C.).

TABLE 3 a

Results of the stability tests with washing-composition formulations comprising VI polymers
WM 1 + 1.0% polymer tel quel

| | Appearance, immediately | Appearance, after 7 days | Appearance, after 28 days |
|---|---|---|---|
| P1 without preservative | clear, homogeneous | clear, homogeneous | clear, homogeneous |
| P3 without preservative | clear, homogeneous | clear, homogeneous | clear, homogeneous |
| P5 without preservative | clear, homogeneous | clear, homogeneous | clear, homogeneous |
| P1 with preservative | clear, homogeneous | clear, homogeneous | clear, homogeneous |
| P3 with preservative | clear, homogeneous | clear, homogeneous | clear, homogeneous |
| P5 with preservative | clear, homogeneous | clear, homogeneous | clear, homogeneous |

TABLE 3 b

Results of the stability tests with washing-composition formulations comprising VI polymers
WM 2 + 0.8% polymer tel quel

| | Appearance, immediately | Appearance, after 7 days | Appearance, after 28 days |
|---|---|---|---|
| P1 without preservative | clear, homogeneous | clear, homogeneous | clear, homogeneous |
| P3 without preservative | clear, homogeneous | clear, homogeneous | clear, homogeneous |
| P5 without preservative | clear, homogeneous | clear, homogeneous | clear, homogeneous |
| P1 with preservative | clear, homogeneous | clear, homogeneous | clear, homogeneous |
| P3 with preservative | clear, homogeneous | clear, homogeneous | clear, homogeneous |
| P5 with preservative | clear, homogeneous | clear, homogeneous | clear, homogeneous |

In summary, the present invention comprises, inter alia, the following variants.

1. An aqueous mixture comprising or consisting of water, at least one 1-vinylimidazole-containing polymer (P) and at least one quaternary ammonium salt (QA).
2. The mixture according to variant 1, wherein the proportion of water is greater than 10% by weight, preferably greater than 20% by weight, further preferably at least 25% by weight, based on the total mixture.
3. The mixture according to variant 1 or 2, wherein the 1-vinylimidazole-containing polymers (P) are selected from polymers having a proportion of vinylimidazole of greater than or equal to 5% by weight, preferably greater than or equal to 10% by weight, further preferably greater than or equal to 15% by weight, based on the polymer (P).
4. The mixture according to any of the preceding variants, wherein the 1-vinylimidazole-containing polymers (P) are homopolymers of 1-vinylimidazole.
5. The mixture according to any of preceding variants 1 to 3, wherein the 1-vinylimidazole-containing polymers (P) are selected from copolymers of 1-vinylimidazole with at least one further monomer (A).
6. The mixture according to variant 5, wherein the 1-vinylimidazole-containing polymers (P) are selected from copolymers of 1-vinylimidazole with at least one further monomer (A) and wherein the at least one further monomer (A) is selected from the list consisting of vinylpiperidone, vinylcaprolactam, 1-vinyloxazolidinone, 4-vinylpyridine N-oxide, N-vinylformamide, N-vinylacetamide, N-vinyl-N-methylacetamide, acrylamide, basic monomers and their quaternized variants, isoprenol, styrene, 1-alkenes, vinyl esters, vinyl ethers, alkyl (meth)acrylates, alkyl maleates, N,N'-dialkylacrylamides, (meth)acrylic acid, itaconic acid, maleic acid, fumaric acid and its alkali metal salts, monomers containing alkylene oxide groups, and mixtures thereof.
7. The mixture according to variant 5, wherein the monomer (A) is 1-vinylpyrrolidone.
8. The mixture according to any of the preceding variants, wherein the 1-vinylimidazole-containing polymers (P) are obtained by polymerizing 1-vinylimidazole and optionally monomer (A), optionally in the presence of up to 50% by weight, preferably up to 30% by weight, of polyalkylene glycols, based on the monomers used.
9. The mixture according to any of the preceding variants, wherein the 1-vinylimidazole-containing polymers (P)

have a molecular weight Mw of 2000 to 200 000 g/mol, preferably 3000 to 100 000 g/mol, further preferably 5000 to 80 000 g/mol.
10. The mixture according to any of the preceding variants, wherein the quaternary ammonium salts (QA) are halide salts, preferably selected from the list consisting of bromide salts and chloride salts.
11. The mixture according to any of the preceding variants, wherein the quaternary ammonium salts (QA) comprise at least one alkyl chain, preferably each comprising 2 to 20, more preferably 4 to 18, methylene groups.
12. The mixture according to any of the preceding variants, wherein the quaternary ammonium salts (QA) are selected from the list consisting of didecyldimethylammonium chloride, benzalkonium chloride, cetylalkonium chloride, cetylpyridinium chloride and mixtures thereof.
13. The mixture according to any of the preceding variants, comprising quaternary ammonium salts (QA) in a proportion of at least 0.01% by weight to 2.0% by weight, preferably 0.01% by weight to 1.0% by weight, further preferably 0.03% to 0.3% by weight, particularly preferably 0.05% to 0.1% by weight, based on the total mixture.
14. The mixture according to any of the preceding variants, comprising polymers (P) in a proportion of 5% to 90% by weight, preferably 20% to 60% by weight, based on the total mixture.
15. A liquid washing composition comprising the mixture according to any of the preceding variants and additionally at least one component selected from the list comprising or consisting of anionic surfactants, nonionic surfactants, cationic surfactants, amphoteric surfactants, enzymes, optical brighteners, complexing agents, polymers, copolymers, soaps, silicone defoamers, solubilizers, short-chain alcohols, dyes, fragrances and mixtures thereof.
16. A process for producing a mixture according to any of preceding variants 1 to 14, by adding an aqueous solution of at least one quaternary ammonium salt (QA) to an aqueous solution of at least one 1-vinylimidazole-containing polymer (P) and subsequent mixing.
17. A process for stabilizing 1-vinylimidazole-containing polymers (P) by adding at least one quaternary ammonium salt (QA).
18. The use of at least one quaternary ammonium salt (QA) for stabilization of 1-vinylimidazole-containing polymers (P).
19. The use of at least one quaternary ammonium salt (QA) for stabilization of liquid washing-composition formulations comprising 1-vinylimidazole-containing polymers (P).

The invention claimed is:
1. A process for producing an aqueous mixture comprising water, at least one 1-vinylimidazole-containing polymer (P) and at least one quaternary ammonium salt (QA), the process comprising adding an aqueous solution of at least one quaternary ammonium salt (QA) to an aqueous solution of at least one 1-vinylimidazole-containing polymer (P) and subsequent mixing, wherein the 1-vinylimidazole-containing polymers (P) are selected from the group consisting of homopolymers of 1-vinylimidazole and copolymers of 1-vinylimidazole with at least one monomer (A) comprising 1-vinylpyrrolidone, wherein the at least one quaternary ammonium salt (QA) is selected from the group consisting of didecyldimethyl-ammonium chloride, benzalkonium chloride, cetylalkonium chloride, cetylpyridinium chloride, and mixtures thereof.
2. The process for producing an aqueous mixture according to claim 1, wherein the proportion of water is greater than 10% by weight, based on the total mixture.
3. The process for producing an aqueous mixture according to claim 1, wherein the at least one monomer (A) vinylpiperidone, vinylcaprolactam, 1-vinyloxazolidinone, 4-vinylpyridine N-oxide, N-vinylformamide, N-vinylacetamide, N-vinyl-N-methylacetamide, acrylamide, basic monomers and their quaternized variants, isoprenol, styrene, 1-alkenes, vinyl esters, vinyl ethers, alkyl (meth)acrylates, alkyl maleates, N,N'-dialkylacrylamides, (meth)acrylic acid, itaconic acid, maleic acid, fumaric acid and its alkali metal salts, monomers containing alkylene oxide groups, or mixtures thereof.
4. The process for producing an aqueous mixture according to claim 1, wherein the 1-vinylimidazole-containing polymers (P) are obtained by polymerizing 1-vinylimidazole and monomer (A), optionally in the presence of up to 50% by weight of polyalkylene glycols, based on the monomers used.
5. The process for producing an aqueous mixture according to claim 1, wherein the 1-vinylimidazole-containing polymers (P) have a molecular weight Mw of 2000 to 200 000 g/mol.
6. The process for producing an aqueous mixture according to claim 1, comprising quaternary ammonium salts (QA) in a proportion of at least 0.01% by weight to 2.0% by weight, based on the total mixture.
7. The process for producing an aqueous mixture according to claim 1, comprising polymers (P) in a proportion of 5% to 90% by weight, based on the total mixture.
8. A process for producing a liquid washing composition comprising by producing an aqueous mixture according to in claim 1 and adding at least one component selected from the group consisting of anionic surfactants, nonionic surfactants, cationic surfactants, amphoteric surfactants, enzymes, optical brighteners, complexing agents, polymers, copolymers, soaps, silicone defoamers, solubilizers, short-chain alcohols, dyes, fragrances and mixtures thereof.
9. A process for producing an aqueous mixture comprising water, at least one 1-vinylimidazole-containing polymer (P) and at least one quaternary ammonium salt (QA), the process comprising adding an aqueous solution of at least one quaternary ammonium salt (QA) to an aqueous solution of at least one 1-vinylimidazole-containing polymer (P) and subsequent mixing, wherein the 1-vinylimidazole-containing polymers (P) are selected from the group consisting of homopolymers of 1-vinylimidazole and copolymers of 1-vinylimidazole with at least one monomer (A), wherein the at least one quaternary ammonium salt (QA) is selected from the group consisting of didecyldimethylammonium chloride, benzalkonium chloride, cetylalkonium chloride, cetylpyridinium chloride, and mixtures thereof, and wherein the polymer (P) comprises from 15% to 90% by weight, based on the total mixture.
10. The process for producing an aqueous mixture according to claim 9, wherein the proportion of water is greater than 10% by weight, based on the total mixture.
11. The process for producing an aqueous mixture according to claim 9, wherein the at least one monomer (A) is selected from the group consisting of vinylpiperidone, vinylcaprolactam, 1-vinyloxazolidinone, 4-vinylpyridine N-oxide, N-vinylformamide, N-vinylacetamide, N-vinyl-N-methylacetamide, acrylamide, basic monomers and their quaternized variants, isoprenol, styrene, 1-alkenes, vinyl esters, vinyl ethers, alkyl (meth)acrylates, alkyl maleates, N,N'-dialkylacrylamides, (meth)acrylic acid, itaconic acid, maleic acid, fumaric acid and its alkali metal salts, monomers containing alkylene oxide groups, and mixtures thereof.

12. The process for producing an aqueous mixture according to claim 9, wherein the monomer (A) is 1-vinylpyrrolidone.

13. The process for producing an aqueous mixture according to claim 9, wherein the 1-vinylimidazole-containing polymers (P) are obtained by polymerizing 1-vinylimidazole and monomer (A), optionally in the presence of up to 50% by weight of polyalkylene glycols, based on the monomers used.

14. The process for producing an aqueous mixture according to claim 9, wherein the 1-vinylimidazole-containing polymers (P) have a molecular weight Mw of 2000 to 200 000 g/mol.

15. The process for producing an aqueous mixture according to claim 9, comprising quaternary ammonium salts (QA) in a proportion of at least 0.01% by weight to 2.0% by weight, based on the total mixture.

16. A process for producing a liquid washing composition comprising producing an aqueous mixture according claim 9 and adding at least one component selected from the group consisting of anionic surfactants, nonionic surfactants, cationic surfactants, amphoteric surfactants, enzymes, optical brighteners, complexing agents, polymers, copolymers, soaps, silicone defoamers, solubilizers, short-chain alcohols, dyes, fragrances and mixtures thereof.

* * * * *